US008549648B2

(12) United States Patent
Sallam

(10) Patent No.: US 8,549,648 B2
(45) Date of Patent: Oct. 1, 2013

(54) SYSTEMS AND METHODS FOR IDENTIFYING HIDDEN PROCESSES

(75) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 213 days.

(21) Appl. No.: 13/074,741

(22) Filed: Mar. 29, 2011

(65) Prior Publication Data
US 2012/0255011 A1  Oct. 4, 2012

(51) Int. Cl.
*G06F 21/00* (2013.01)
(52) U.S. Cl.
USPC .............................................. 726/24; 726/30
(58) Field of Classification Search
None
See application file for complete search history.

(56) References Cited

U.S. PATENT DOCUMENTS

2007/0079178 A1*  4/2007  Gassoway ........................ 714/38
2008/0016339 A1*  1/2008  Shukla ........................... 713/164
2011/0209219 A1*  8/2011  Zeitlin et al. ..................... 726/23

OTHER PUBLICATIONS

U.S. Appl. No. 13/073,791; pp. 93, filed Mar. 28, 2011.
U.S. Appl. No. 13/073,810; pp. 85, filed Mar. 28, 2011.
U.S. Appl. No. 13/073,842; pp. 85, filed Mar. 28, 2011.
U.S. Appl. No. 13/077,227; pp. 113, filed Mar. 31, 2011.
U.S. Appl. No. 13/073,853; pp. 114, filed Mar. 28, 2011.
U.S. Appl. No. 13/075,049; pp. 105, filed Mar. 29, 2011.
U.S. Appl. No. 13/076,493; pp. 102, filed Mar. 31, 2011.
U.S. Appl. No. 13/077,305; pp. 129, filed Mar. 31, 2011.
U.S. Appl. No. 13/074,831; pp. 150, filed Mar. 29, 2011.
U.S. Appl. No. 13/074,925; pp. 147, filed Mar. 29, 2011.
U.S. Appl. No. 13/074,947; pp. 147, filed Mar. 29, 2011.
U.S. Appl. No. 13/077,270; pp. 132, filed Mar. 31, 2011.
U.S. Appl. No. 13/076,537; pp. 141, filed Mar. 31, 2011.
U.S. Appl. No. 13/073,864; pp. 101, filed Mar. 28, 2011.
U.S. Appl. No. 13/075,072; pp. 130, filed Mar. 29, 2011.
U.S. Appl. No. 13/075,101; pp. 134, filed Mar. 29, 2011.
U.S. Appl. No. 13/076,512; pp. 129, filed Mar. 31, 2011.
U.S. Appl. No. 13/076,480; pp. 139, filed Mar. 31, 2011.
U.S. Appl. No. 13/076,473; pp. 129, filed Mar. 31, 2011.

* cited by examiner

*Primary Examiner* — William Goodchild
*Assistant Examiner* — Nega Woldemariam
(74) *Attorney, Agent, or Firm* — Baker Botts L.L.P.

(57) ABSTRACT

A security module may be configured to execute on the electronic device at a level below all of the operating systems of an electronic device accessing the one or more system resources. The security module may be configured to: trap one or more attempts to access system resources of the electronic device, the one or more attempts made from a less privileged ring of execution than the first security module; record information identifying one or more processes attempting to access the system resources of the electronic device; compare the information identifying one or more processes attempting to access the system resources with the enumerated one or more processes visible to the operating system; and based on the comparison, determine one or more hidden processes, the hidden processes determined by at least identifying processes whose information was recorded by first security module but were not enumerated by the second security module.

17 Claims, 12 Drawing Sheets

SYSTEMS AND METHODS FOR IDENTIFYING HIDDEN PROCESSES

TECHNICAL FIELD

The present invention relates generally to computer security and malware protection and, more particularly, to a system and method for protection of electronic systems against malware that may create hidden processes.

BACKGROUND

Native operating system services can prevent security software from installing arbitrary hooking within the kernel of operating systems. Security software is thus prevented from filtering all behaviors of an electronic device, including potentially malicious actions by malware. Malware may include, but is not limited to, spyware, rootkits, password stealers, spam, sources of phishing attacks, sources of denial-of-service-attacks, viruses, loggers, Trojans, adware, or any other digital content that produces malicious activity.

The filtering functionality provided by the operating system may be limited, and only available on timelines decided by the operating system vendor. Malware can operate and reside at the same level as security software, particularly in the operating system kernel and thus compromise both the operating system and the integrity of the security software itself.

Many forms of aggressive kernel mode malware tamper with user mode memory to accomplish malicious tasks such as injecting malicious code dynamically, modifying user mode code sections to alter execution paths and redirect into malicious code, and modify user mode data structures to defeat security software. Additionally, some malware may attack anti-malware applications and processes from the kernel by tampering with process memory code and data sections to deceive the detection logic.

Kernel mode rootkits and other malware employ various methods to hide their presence from user mode applications and kernel mode device drivers. The techniques used may vary depending upon where the infection takes place. For example, malware attacking the kernel active process list of an operating system to delist or unlink a rootkit or other malware process. Other malware may tamper with the code sections of process access and enumeration functions.

SUMMARY

In accordance with one embodiment of the present disclosure, a system for protecting an electronic device against malware, may include one or more system resources of the electronic device, one or more operating systems of the electronic device, a first security module configured to execute on the electronic device at a level below all of the operating systems of the electronic device accessing the one or more system resources; and a second security module configured to enumerate one or more processes running on the electronic device, the one or more processes visible to the operating system. The first security module may be configured to: (i) trap one or more attempts to access system resources of the electronic device, the one or more attempts made from a less privileged ring of execution than the first security module; (ii) record information identifying one or more processes attempting to access the system resources of the electronic device; (iii) compare the information identifying one or more processes attempting to access the system resources with the enumerated one or more processes visible to the operating system; and (iv) based on the comparison, determine one or more hidden processes, the hidden processes determined by at least identifying processes whose information was recorded by first security module but were not enumerated by the second security module.

In accordance with another embodiment of the present disclosure, a method for protecting an electronic device against malware may include enumerating one or more processes running on the electronic device, the one or more processes visible to one or more operating systems of the electronic device. The method may also include trapping, at a level below all of the operating systems of the electronic device accessing system resources of the electronic device, such priority defined by a processor of the electronic device, one or more attempts to access system resources of the electronic device, the one or more attempts made from a same or lower priority than an operating systems of the electronic device, such priority defined by the processor. Additionally, the method may include recording information identifying one or more processes attempting to access the system resources of the electronic device. Moreover, the method may include comparing the information identifying one or more processes attempting to access the system resources with the enumerated one or more processes visible to the operating system. The method may further include determining one or more hidden processes, the hidden processes identified at least by determining processes identified by the recorded information of attempts to access the system resources of the electronic device by processes, but not enumerated as visible to the operating system, based on the comparison.

In accordance with an yet another embodiment of the disclosure, an article of manufacture may include a computer readable medium and computer-executable instructions carried on the computer readable medium. The instructions may be readable by a processor, and, when read and executed, cause the processor to: (i) enumerate one or more processes running on the electronic device, the one or more processes visible to one or more operating systems of the electronic device; (ii) trap, at a level below all of the operating systems of the electronic device accessing one or more system resources of the electronic device, one or more attempts to access the system resources of the electronic device, the one or more attempts made from a same or less privileged ring of execution than all of the operating systems of the electronic device; (iii) record information identifying one or more processes attempting to access the system resources of the electronic device; (iv) compare the information identifying one or more processes attempting to access the system resources with the enumerated one or more processes visible to the operating system; and (v) based on the comparison, determine one or more hidden processes, the hidden processes identified at least by determining processes identified by the recorded information of attempts to access the system resources of the electronic device by processes, but not enumerated as visible to the operating system.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

Figure 1:
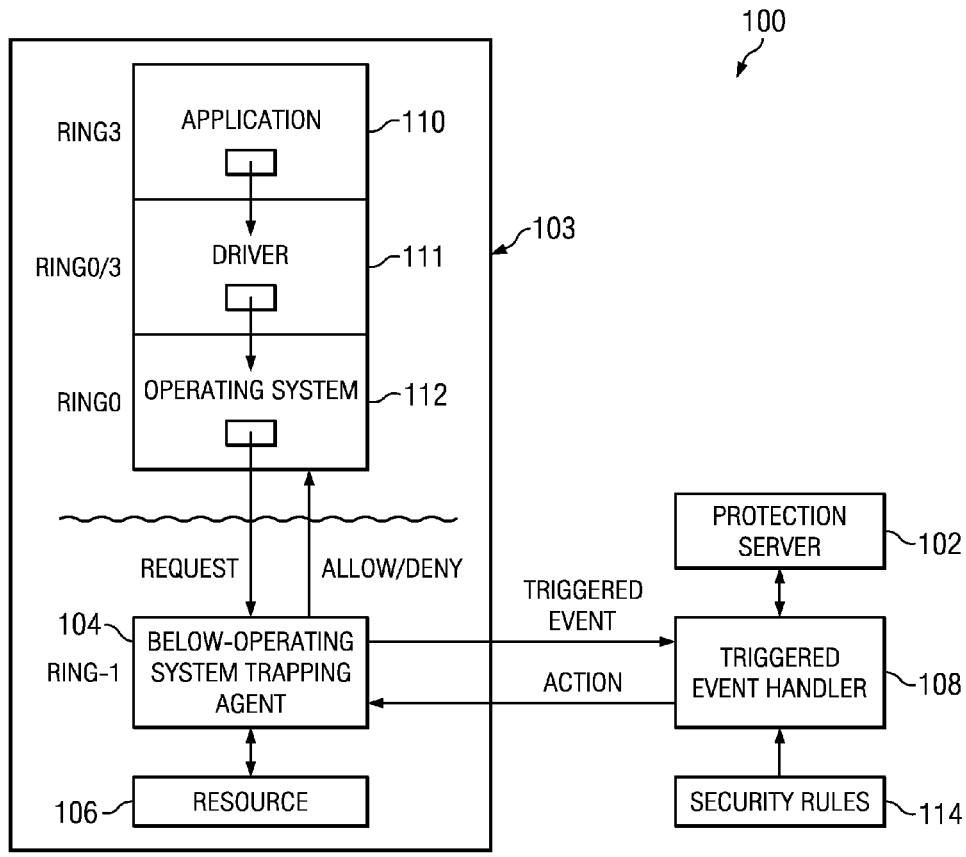
FIG. 1 is an example embodiment of a system for protecting an electronic device from malware.

FIG. 1 is an example embodiment of a system 100 for protecting an electronic device from malware. System 100 may include a below-operating system ("O/S") trapping agent 104 communicatively coupled to a triggered event handler 108. Below-O/S trapping agent 104 may be configured to trap various attempted accesses of a resource 106 of an electronic device 103. Below-O/S trapping agent 104 may be configured to create a triggered event associated with the trapped attempted access, and to send the triggered event to a triggered event handler 108. Triggered event handler 108 may be configured to consult one or more security rules 114 or a protection server 102 to determine how to handle the triggered event. Triggered event handler 108 may also be configured to evaluate the triggered event's propensity to be an indication of malware, or a malicious attempt to subvert the resources or operation of electronic device 103. Furthermore, triggered event handler 108 may be configured to provide a determination to below-O/S trapping agent 104 of whether the triggered event should be allowed or denied, or may be configured to yield another corrective action.

Below-O/S trapping agent 104 may be implemented at a lower functional level than the operating systems in electronic device 103. For example, below-O/S trapping agent 104 may intercept attempted accesses of resource 106 by an operating system 112, a driver 111, or an application 110. Below-O/S trapping agent 104 may be running on a processor of electronic device 103 without use of an operating system. In one embodiment, below-O/S trapping agent 104 may be operating on a bare-metal environment or execution level. In addition, below-O/S trapping agent 104 may be running at a higher execution priority, as defined by a processor of electronic device 103, than all operating systems of electronic device 103. For example, in the context of a hierarchical protection domain model using protection rings, wherein a lower number represents a higher priority, operating system 112 may be operating at "Ring0" while below-O/S trapping agent 104 may be operating at "Ring –1." Drivers 111 and applications 110 may be operating at "Ring0" or "Ring3." In some embodiments of processors, the concept of "Ring –1" may be known as "Ring0 privileged mode," and the concept of "Ring0" may be known as "Ring0 non-privileged mode." Operation in "Ring –1" or "Ring0 privileged mode" may entail additional overhead and expense than "Ring0" or "Ring0 privileged mode." Operating systems of electronic device 103 may run at Ring0.

Below-O/S trapping agent 104 may operate transparently to entities running at Ring0 or higher. Thus the attempted access of resource 106 may be requested by operating system 112 or another entity in the same manner whether below-O/S trapping agent 104 is present or not. Below-O/S trapping agent 104, when enforcing a received action, may allow the request to happen, may deny the request, or take other corrective action. To deny the request, below-O/S trapping agent 104 may simply not pass the request to the resource 106 or processor, or may provide a spoofed or dummy reply to the request to convince operating system 112 that the action has occurred.

By running at "Ring –1," at a higher priority than the pertinent operating systems of electronic device 103, or below the pertinent operating systems of electronic device 103, below-O/S trapping agent 104 may avoid much of the malware that plagues operating systems such as operating system 112. Malware may trick operating system 112 or even anti-malware software running at "Ring0," as malware may also be running at "Ring0" priority. However, malware on electronic device 103 must still make requests of resource 106 if it is to carry out malicious activities. Thus, trapping operations linked to sensitive resources may be better accomplished by a trapping agent running below the level of operating systems in electronic device 103.

Below-O/S trapping agent 104 may be implemented in any suitable manner. In one embodiment, below-O/S trapping agent 104 may be implemented in a virtual machine monitor. Such an embodiment may operate below the level of operating systems as described for below-O/S trapping agent 104. Descriptions of an example of such an embodiment may be found in, for example, discussions of FIG. 2, below, of a security virtual machine monitor 216. In another embodiment, below-O/S trapping agent 104 may be implemented in firmware. Such an embodiment may operate below the level of operating systems as described for below-O/S trapping agent 104. Descriptions of an example of such an embodiment may be found in, for example, discussions of FIGS. 4 and 5, below, of a firmware security agent 440, 516, or PC firmware security agent 444. In yet another embodiment, below-O/S trapping agent 104 may be implemented in microcode. Such an implementation may operate below the level of operating systems as described for below-O/S trapping agent 104. Descriptions of an example of such an embodiment may be found in, for example, discussions of FIG. 7, below, of a microcode security agent 708. Below-O/S trapping agent 104 may be implemented in a combination of these embodiments.

Triggered event handler 108 may be embodied by one or more event handlers or security agents communicatively coupled together. Triggered event handler 108 and below-O/S trapping agent 104 may be implemented in the same security agent. In one embodiment, triggered event handler 108 may be operating at the same priority ring as below-O/S trapping agent. In another embodiment, triggered event handler 108 may be operating at the same priority as operating system 112, driver 111, or application 110. In still yet another embodiment, triggered event handler 108 may be implemented by two or more triggered event handlers wherein at least one triggered event handler operates at the same priority ring as below-O/S trapping agent, and at least one triggered event handler operates at the level of operating system 112, driver 111, or application 110. By running at the level of below-O/S trapping agent 104, triggered event handler 108 may similarly avoid the problems of "Ring0" or "Ring3" malware infecting the agent itself. However, a triggered event handler 108 running at "Ring0" or "Ring3" with operating system 112, driver 111, or application 110 may be able to provide context information about an attempted access of resource 106 that may be unavailable from the viewpoint of "Ring −1" agents.

Triggered event handler 108 may be implemented in any suitable manner. In one embodiment, triggered event handler 108 may be implemented in a virtual machine monitor or virtual machine monitor security agent. Such an embodiment may operate below the level of operating systems as described for triggered event handler 108. Descriptions of an example of such an embodiment may be found in, for example, discussions of FIG. 2, below, of a security virtual machine monitor 216 or security virtual machine monitor security agent 217. In another embodiment, triggered event handler 108 may be implemented fully or in part in firmware. Such an embodiment may operate below the level of operating systems as described for triggered event handler 108. Descriptions of an example of such an embodiment may be found in, for example, discussions of FIGS. 4 and 5, below, of a firmware security agent 440, 516, or PC firmware security agent 444. Triggered event handler 108 may also be implemented in the below-O/S agent 450 in FIG. 4, which may itself be implemented in such ways as in a virtual machine monitor, firmware, or microcode. In yet another embodiment, triggered event handler 108 may be implemented in microcode. Such an implementation may operate below the level of operating systems as described for triggered event handler 108. Descriptions of an example of such an embodiment may be found in, for example, discussions of FIG. 7, below, of a microcode security agent 708. Triggered event handler 108 may also be implemented in the below-O/S agent 712 of FIG. 7, which may itself be implemented in such ways as in a virtual machine monitor, firmware, or microcode. Triggered event handler 108 may be implemented in a combination of these embodiments.

In one embodiment, below-operating system trapping agent 104 and/or triggered event handler 108 may operate in a bare metal layer of electronic device 103. Below-operating system trapping agent 104 and/or triggered event handler 108 may operate without use of an operating system between them and the resource 106 that they are configured to protect. The resource 106 may include a processor, features of the processor, memory, the entities residing in the memory such as data structures, or the entities residing in the memory for execution by the processor such as functions, processes, or applications. Below-operating system trapping agent 104 and/or triggered event handler 108 may operate directly on the hardware of electronic device 103. Below-operating system trapping agent 104 and/or triggered event handler 108 may not require the use of an operating system such as operating system 112 to execute nor gain full access to resource 106.

Other operating systems may exist on electronic device 103 which do not participate in the relationship between entities at the level operating system 112, below-operating system trapping agent 104 and triggered event handler 108, and resource 106. For example, a pre-boot operating system may securely launch portions of electronic device, but not participate in the normal operation of electronic device in terms of handling requests from application 110, driver 111, and operating system 112 made of resource 106. In another example, electronic device 103 may contain motherboard components, plug-in cards, peripherals, or other components which contain their own sets of operating systems and processors to perform functions outside of the relationship between entities at the level operating system 112, below-operating system trapping agent 104 and triggered event handler 108, and resource 106. These operating systems may be embedded operating systems. Any of these operating systems might not be used for the execution of below-operating system trapping agent 104 and triggered event handler 108. Further, any of these operating systems might not access the resource 106 protected by trapping agent 104 and triggered event handler 108.

System 100 may include any combination of one or more below-operating system trapping agents 104 and one or more triggered event handlers 108. Descriptions of the below-operating system trapping agents 104 and triggered event handlers 108 may be found in descriptions of trapping agents, event handlers, and security agents in the figures that follow.

Figure 4:
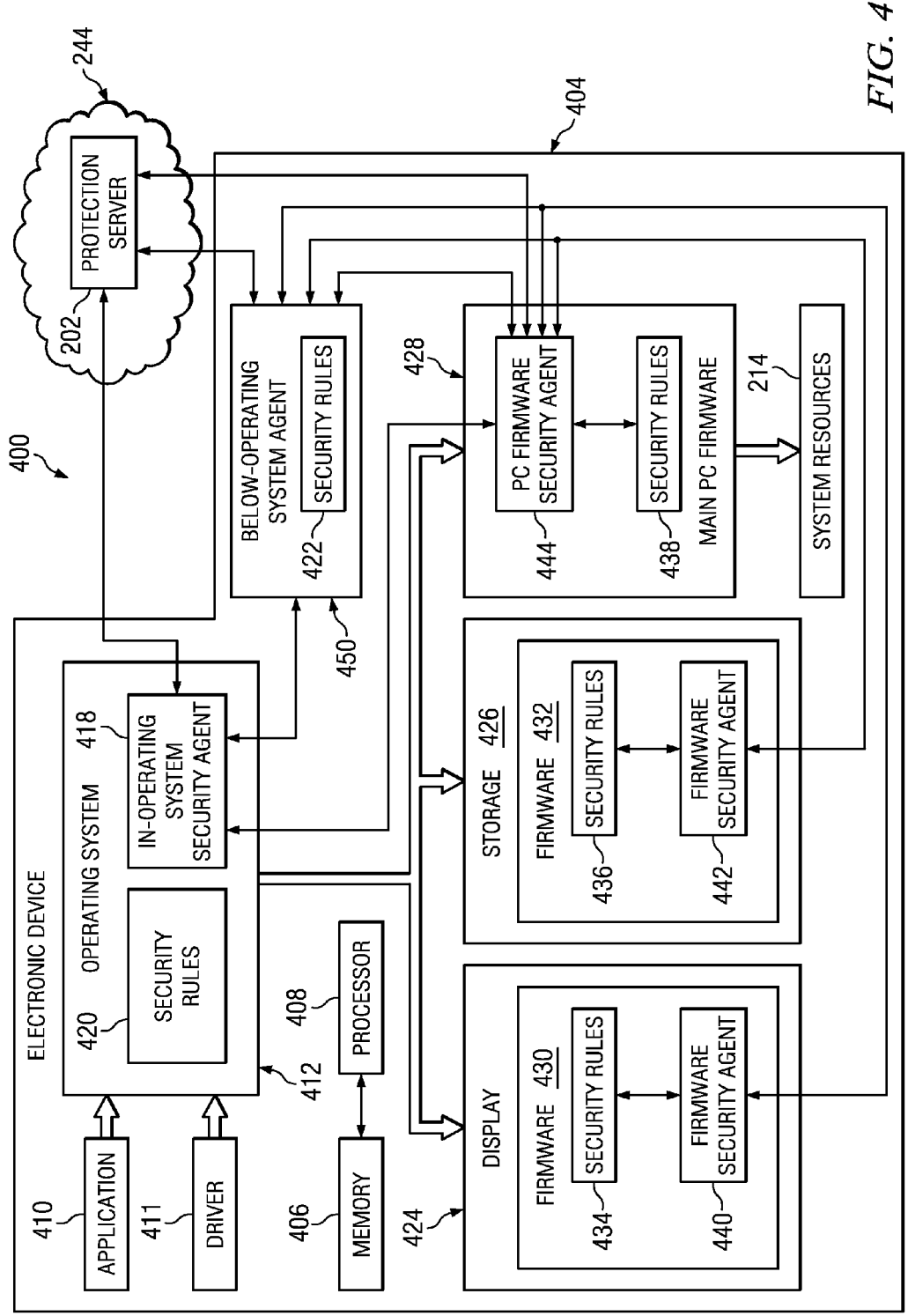
FIG. 4 is an example embodiment of a firmware-based and security-rule-based system for protecting an electronic device from malware.

Resource 106 may include any suitable resource of an electronic device. For example, resource 106 may include registers, memory, controllers, or I/O devices. Descriptions of example embodiments of resource 106 may be found in descriptions of, for example, the system resources 214 of FIG. 2, components such as display 430 and storage 432 as shown in FIG. 4, or the system resources 724 of FIG. 7 below.

Security rules 114 may include any suitable rules, logic, commands, instructions, flags, or other mechanisms for informing below-O/S trapping agent 104 about what actions to trap, or for informing triggered event handler 108 to handle an event based on a trapped action. Triggered event handler 108 may be configured to provide one or more of security rules 114 to below-O/S trapping agent. Descriptions of example embodiments of some or all of security rules 114 may be found, for example, in descriptions of security rules 222 of FIG. 2, security rules 422, 434, 436, 438 of FIG. 4, security rules 518 of FIG. 5, or security rules 707, 723 of FIG. 7 below.

Kernel mode and user mode entities such as application 110, driver 111, and operating system 112 of system 100 may be implemented in any suitable manner. Descriptions of example embodiments of application 110, driver 111, and operating system 112 of system 100 may be found in descriptions of, for example, application 210, driver 211 and operating system 212 of FIG. 2; application 410, driver 411, and operating system 412 of FIG. 4; and application 709, driver 711, and operating system 713 of FIG. 7 below.

Electronic device 103 may be implemented in any suitable manner, such as in a computer, a personal data assistant, a phone, mobile device, server, or any other device configurable to interpret and/or execute program instructions and/or process data. Descriptions of example embodiments of electronic device 103 may be found in discussions of, for example, electronic device 204 of FIG. 2, electronic device 404 of FIG. 4, or electronic device 701 of FIG. 7.

System 100 may be implemented in any suitable system for trapping attempted access of resources at a level underneath the operating systems of electronic device 103. System 100 may also be implemented in any suitable means for handling the attempted access by consulting security rules to determine whether the attempted access is malicious or not. For example, system 100 may be implemented by the systems and methods 200, 300, 400, 500, 600, 700, and 800 as described in FIGS. 2-8 below.

Figure 2:
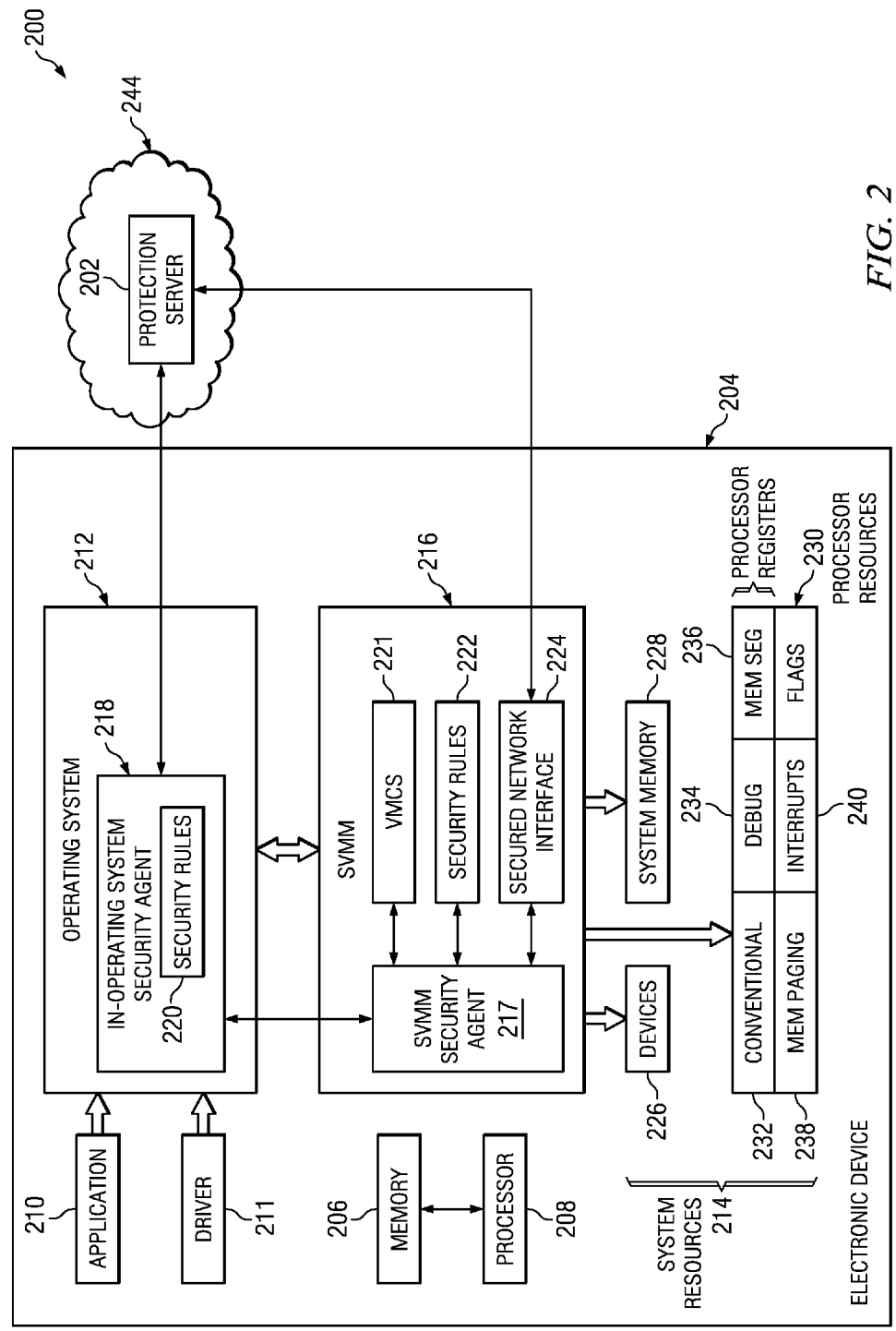
FIG. 2 is an example embodiment of a system for a virtual-machine-monitor-based and security-rule-based configurable security solution for protecting an electronic device from malware.

FIG. 2 is an example embodiment of a system 200 for a virtual-machine-monitor-based and security-rule-based configurable security solution for protecting an electronic device from malware. System 200 may be an example embodiment of a system 100, implementing certain elements of system 100 in a virtual machine monitor. System 200 may include an electronic device 204 which is to be protected against malware by a configurable security solution. The configurable security solution of system 200 may include a security agent running below all operating systems, a security virtual machine monitor, a cloud-based security agent and an in-O/S behavioral security agent. The below-O/S security agent and security virtual machine monitor may be configured to guard access to system resources of the electronic device 204, including the resources used by the in-O/S behavioral security agent. The below-O/S security agent may be running in the security virtual machine monitor. The cloud-based security agent may be configured to provide malware detection information to the below-O/S security agent and to the in-O/S behavioral security agent, and to receive information regarding suspicious behavior possibly-associated with malware from the security virtual machine monitor and in-O/S behavioral security agent. The in-O/S behavioral security agent may be configured to scan the electronic device 204 for evidence of malware operating on the electronic device. System 200 may include one or more below-O/S security agents configured to trap attempted use of access to the resources of the electronic device 204, generate a triggered event corresponding to the attempt, consult security rules regarding the triggered event, and take corrective action if necessary regarding the attempt.

In one embodiment, system 200 may include protection server 202 communicatively coupled to one or more in-O/S security agents 218 and a security virtual machine monitor ("SVMM") security agent 217. SVMM security agent 217 may reside in a SVMM 216. SVMM 216 may reside and operate upon electronic device 204. In-O/S security agent 218 and SVMM security agent 217 may be communicatively coupled. Protection server 202, in-O/S security agent 218, SVMM security agent 217 and SVMM 216 may be configured to protect electronic device 204 from infections of malware.

SVMM security agent 217 may be an example embodiment of the triggered event handler 108 of FIG. 1. SVMM 216 may be an example embodiment of the below-O/S trapping agent 104 of FIG. 1.

Electronic device 204 may include a memory 208 coupled to a processor 206. Electronic device 204 may include one or more applications 210 or drivers 211 executing on electronic device for any suitable purpose. Electronic device 204 may include an operating system 212. Operating system 212 may be configured to provide access to system resources 214 of electronic device 204 to applications 210 or drivers 211. SVMM 216 may be configured to intercept such calls of operating system 212 of system resources 214. SVMM 216 and SVMM security agent 217 may operate below the level of operating system 212. For example, SVMM 216 and SVMM security agent 217 may operate directly on processor 206 in a privileged mode such as "Ring −1."

Processor 206 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 206 may interpret and/or execute program instructions and/or process data stored in memory 208. Memory 208 may be configured in part or whole as application memory, system memory, or both. Memory 208 may include any system, device, or apparatus configured to hold and/or house one or more memory modules; for example, memory 208 may include read-only memory, random access memory, solid state memory, or disk-based memory. Each memory module may include any system, device or apparatus configured to retain program instructions and/or data for a period of time (e.g., computer-readable non-transitory media).

Protection server 202 may be operating on a network 244. Protection server 202 operating on network 244 may implement a cloud computing scheme. Protection server 202 may be configured to communicate with elements of electronic device 204 to update malware detection rules and information. Protection server 202 may be configured to receive information regarding suspicious activities originating from electronic device 204 and determine whether or not such suspicious activities are indications of malware infection. Operating system 212 may include one or more in-O/S security agents 218. In-O/S security agent 218 may be configured to receive monitoring and detection rules from protection server 202, such as in-O/S security rules 220. In-O/S security agent 218 may be configured to use the in-O/S security rules 220 received by protection server 202 to monitor and prevent suspicious activities on electronic device 204. In-O/S security agent 218 may be configured to report detected suspicious activities back to protection server 202. In-O/S security agent 218 may be configured to prevent malware operations and to report such preventions to protection server 202. If more than one in-O/S security agent 218 is present in system 200, each in-O/S security agent 218 may be configured to perform a designated portion of the trapping, validating, or other tasks associated with in-O/S security agent 218. Such portions may be defined by below-operating-system security agents. For example, one in-O/S security agent 218 may validate or investigate MOV instructions, while another in-O/S security agent 218 may validate or investigate JMP instructions. In-O/S security agent 218 may be configured to determine the life cycle of a particular page in memory. For example, in-O/S security agent 218 may know the processes and steps typically used by operating system 212 to allocate a page of memory. Similarly, in-O/S security agent 218 may know the processes and steps typically used by operating system 212 to load an image of an application in its loader. Such processes may follow a static pattern of operation. Thus, in-O/S security agent 218 may be configured to track the operation of operating system 212 to determine whether for a given action standard procedures were followed. In-O/S security agent 218 may communicate with SVMM security agent 217 to determine whether or not an operation trapped by SVMM security agent 217 generated the corresponding expected actions observed by in-O/S security agent 218. A discrepancy may indicate that malware has attempted to perform a system function outside of the normal operation of the operating system 212. Thus, for example in-O/S security agent 218 and SVMM security agent 217 may determine whether a page in question was loaded in memory directly by malware or was loaded by the operating system loader. Such a behavior may cause in-O/S security agent 218 or SVMM security agent 217 to report information to protection server 202, employ more aggressive trapping and checking, or take any other corrective measures.

In one embodiment, in-O/S security agent 219 may be configured to provide contextual information by embedding itself within operating system 212. For example, in-O/S security agent 219 may be configured to register itself or a subcomponent as a driver filter, and attach itself to a main driver to determine what the driver sees or does not see. By attached as a filter to NDIS.SYS, for example, in-O/S security agent 219 may be configured to report the file I/O operations seen by the operating system 212 drivers.

In another embodiment, in-O/S security agent 219 may be configured to provide such information observed from within operating system 219 to SVMM security agent 216 or other below-O/S security agents for comparison with information observed below the operating system. Discrepancies between the two sets of information may indicate a presence of malware attempting to hide itself. For example, in-O/S security agent 219 may hook or filter NDIS.SYS, and monitor for file writes to a particular file. SVMM security agent 216 may monitor input and output commands. If SVMM security agent 216 determined more writes than should have been seen based on the list of function calls seen by in-O/S security agent 219, then malware may be clandestinely writing to disk outside of the functions provided by operating system 212.

Network 244 may be implemented in any suitable network for communication, such as: the Internet, an intranet, wide-area-networks, local-area-networks, back-haul-networks, peer-to-peer-networks, or any combination thereof. Protection server 202 may use the reports submitted from various security agents 218 running on various electronic devices 204 to further detect malware by applying prevalence and reputation analysis logic. For example, a suspicious behavior identified on electronic device 204 may be synthesized into a rule for protection server 202 to proactively protect other electronic devices 204. Such a rule may be determined, for example, based on the number of times that a suspicious driver has been reported. For example, an unknown driver with a narrow or slow distribution pattern may be associated with malware. On the other hand, an unknown driver with a wide and fast distribution may be associated with a patch of a popular and widely available application. In another example, such a detected driver may have been determined by security software running on another electronic device to have accessed a website known to host malware. Such a driver may be determined to be associated with malware.

SVMM 216 may implement some or all of the security virtual machine monitoring functions of system 200. SVMM 216 may be configured to intercept access to system resources—such as registers, memory, or I/O devices—to one or more operating systems running on an electronic device. The security virtual machine monitoring functions of system 200 may be implemented using SVMM 216, or any other virtual machine monitor configured to protect electronic device 204 according to the teachings of this disclosure. SVMM 216 may be configured to control and filter actions taken by operating system 212 while operating system 212 attempts to access system resources 214, on behalf of itself or on behalf of applications 210 running through operating system 212. SVMM 216 may run underneath operating system 212 on electronic device 204 and may have control over some or all processor resources made available to operating system 212 and application 210 or driver 211. Application 210 may comprise any application suitable to run on electronic device 204. Driver 211 may comprise any driver suitable to run on electronic device 204. The processor resources made available for control by SVMM 216 may include those resources designated for virtualization. In one embodiment, SVMM 216 may be configured to virtualize system resources 214 for access by operating system 212, application 210, or driver 211. As examples only, such system resources 214 may include input-output devices 226, system memory 228, or processor resources 230. As examples only, processor resources 230 may include conventional registers 232, debug registers 234, memory segmentation 236, memory paging 238, interrupts 240 or flags 242. I/O devices 226 may include access to such devices such as keyboard, display, mice, or network cards.

SVMM 216 may be configured to trap the execution of operations originating from operating system 212 to access system resources 214. SVMM 216 may include a control structure configured to trap specific attempted accesses of system resources 214. Any suitable control structure may be used. In one embodiment, such a control structure may include virtual machine control structure ("VMCS") 221. SVMM 216 may be configured to trap such execution by manipulating flags inside of VMCS 221. SVMM 216 may be configured to trap any suitable operation of operating system 212, application 210, or driver 211 involving an access of system resources 214. Such trapped operations may include, for example: reading, writing and execution of particular pages of memory in system memory 228; loading and storing a value to or from a processor register 230; or reading and writing to or from I/O devices 226. Any such operations may cause a Virtual Machine Exit ("VM Exit"), which may be trapped by SVMM 216. SVMM 216 may be configured to trap the generation of interrupts 240, which may be generated by the processor 208 or initiated by elements of operating system 212. SVMM 216 may be configured to trap the attempted reading and writing to or from I/O device 226 by trapping IN and OUT instructions. SVMM may be configured to trap such instructions by trapping access to mechanisms, for example, of Virtualization Technology Directed I/O ("VTd"). VTd may allow I/O device virtualization according to processor 208. By accessing VTd facilities, SVMM security agent 217 may be configured to determine devices connected by VTd, determine meta information from operating system 212, ports on the I/O device, or other suitable information. SVMM security agent 217 may be configured to control or trap the operation of such virtualized device access. For example, SVMM security agent 217 may be configured to determine I/O permission maps, containing I/O assignments given to programmable I/O ports. SVMM security agent 217 may be configured to trap access to such permission maps, which may be done by malware, or use such permission maps to determine the relationship of entities on operating system 212 and a request of an I/O device.

In one embodiment, SVMM security agent 217 may be operating in SVMM 216. In another embodiment, SVMM security agent 217 may be operating outside of SVMM 216, but may be communicatively coupled to SVMM 216. In such an embodiment, SVMM security agent 217 may be operating below the level of operating systems of electronic device 204 such as operating system 212. SVMM security agent 217 may be operating at the same level and/or the same priority of SVMM 216. SVMM security agent 217 may be configured to handle events triggered by or trapped by SVMM 216. SVMM security agent 217 may be configured to access contents of memory 228 or a disk at a level below the operating system 212 so as to examine the contents free of interference of kernel-level rootkits. Furthermore, some operations of SVMM security agent 217 may be implemented by SVMM 216, and some operations of SVMM 216 may be implemented by SVMM security agent 217.

SVMM security agent 217 may be configured to set the operation of SVMM 216 in terms of what actions will cause a trap or trigger. In one embodiment, SVMM 216 may be configured to communicate the detection of trapped actions to SVMM security agent 217. SVMM security agent 217 may be configured to consult security rules 222 to determine whether the trapped actions indicate malware or malicious activities, and based upon security rules 222 may provide indications to SVMM 216 about what subsequent action to take. Such subsequent action may include allowing the attempted action, disallowing the attempted action, or taking other corrective steps.

The operation of trapping the attempted access and execution of system resources 214 by SVMM 216 and SVMM security agent 217 may be coordinated through information gathered by in-O/S security agent 218. In-O/S security agent 218 may be configured to provide context to the trapping and handling operations of SVMM 216 and SVMM security agent 217. For example, a particular operating system data structure may normally only be written to by a specific application or service. In-O/S security agent 218 may determine what applications or processes are currently visibly running on operating system 212 and communicate the information to SVMM security agent 217. If the specific application or service is not listed as visibly running, then the attempted write to the data structure may have come from an unauthorized application or process.

In-O/S security agent 218 may be configured to communicate with SVMM 216 and/or SVMM security agent 217 via hypercalls. Hypercalls may be implemented with a descriptor table defining available requests that may be used, as well as associated input and output parameters. Such a descriptor table may define one or more requests possible for in-O/S security agent 218 to communicate with SVMM 216 and/or SVMM security agent 217. Such a descriptor table may also define where input and output parameters for such a request may be located in memory.

In-O/S security agent 218, SVMM security agent 217, and protection server 202 may be configured to authenticate each other. Each of security agent 212, SVMM security agent 217 and protection server 202 may be configured to not continue communications with each other unless each of the entities is authenticated. SVMM 216 may be configured to locate the in-O/S security agent 218 image in memory 206, and use cryptographic signing algorithms to verify the in-O/S security agent 218 image in memory 206. Authentication between protection server 202, in-O/S security agent 218 and SVMM security agent 217 may use any suitable method, including cryptographic hashing and/or signing algorithms. In one embodiment, such authentication may involve the exchange of a private secret key. In-O/S security agent 218 may be configured to receive a secret key from protection server 202 to verify the instance of SVMM security agent 217.

In-O/S security agent 218 may have contextual information regarding the operation of operating system 212. In-O/S security agent 218 may be configured to communicate with SVMM security agent 217 to provide such contextual information. SVMM security agent 217 may instruct SVMM 216 on, for example, how to define certain pages of memory, or which registers to trap.

SVMM 216 may be configured to trap access attempts to system resources 214 defined by SVMM security agent 217. For example, for traps of memory access, SVMM 216 may be configured to trap operations such as read, write or execute. For trapping access to processor registers 230, SVMM 216 may be instructed to trap operations including load, store, or read register values. For trapping I/O operations, I/O devices 226, SVMM 216 may be instructed to trap operations such as input or output to keyboards, mice, or other peripherals. SVMM security agent 217 and/or other below-operating system security agents in the figures below may, in conjunction with in-operating system security agents, may be configured to determine for an I/O operation, the identity of a target I/O device 226, target operation to be performed upon the I/O device 226, and the data to be transferred.

SVMM security agent 217 may be configured to determine contextual information, such as what entity of operating system 212 has attempted to access a resource of electronic device 204, or to what entity of operating system 212 a resource may belong. SVMM security agent 217 may be configured to make such determinations through any suitable method. In one embodiment, SVMM security agent 217 may be configured to access contextual information for such determinations from in-operating system security agent 218. In another embodiment, SVMM security agent 217 may be configured to, directly or indirectly, access a call stack of operating system 212 and/or an execution stack of processor 208 to determine the order of calls made by different processes or applications of operating system 212. An Execution Instruction Pointer may point to the instruction causing the trigger, while an Execution Stack Pointer and Execution Base Pointer may point to the stack frames. By walking through the Execution Base Pointer through the stack, previous function calls may be identified providing context for the operation at hand. Such stacks may indicate the operation that was attempted as well as a source memory location. In yet another embodiment, SVMM security agent 217 may be configured to use a memory map in conjunction with security rules 222 to determine whether an attempt is malicious or indicative of malware. Such a memory map may, for example, indicate the entity that made an attempted access of resources, given a memory location of the attempted access. Such a memory map may be defined, for example, in virtual memory page identifiers and/or physical memory addresses. Such a memory map may, in another example, indicate the entity corresponding to the memory location of the target of the attempt. Using the memory map, SVMM security agent 217 may be configured to determine the identities of the source and targets, or entity owners thereof, of an attempted access. The memory map may be created in part by SVMM security agent 217 or other below-O/S security agents in the figures below in conjunction with in-operating system security agents through monitoring the execution of the system. SVMM security agent 217 and/or other below-operating system security agents in the figures below may, in conjunction with in-operating system security agents, determine for a given memory page or physical address whether such a location belongs to a particular code section or data section; to which module, process, application, image, or other entity it belongs; or whether it is associated with user mode or kernel mode entries. SVMM security agent 217 and/or other below-operating system security agents in the figures below may, in conjunction with in-operating system security agents, determine metadata for the mapping of virtual memory and physical memory indicating the identification, location, and permissions of various entities running on the electronic device 204. Similarly, SVMM security agent 217 and/or other below-operating system security agents in the figures below may use a mapping of sectors in a mass storage device to determine the location of images of such entities in the mass storage device. SVMM security agent 217 and/or other below-operating system security agents in the figures below may, in conjunction with in-operating system security agents, determine for a given entity the sectors, files, directories, and volumes on which they reside.

SVMM security agent 217 may be configured to allocate memory such as system memory 228 as required for operation of in-O/S security agent 218, SVMM security agent 217, and SVMM 216. SVMM security agent 217 may be configured to request that SVMM 216 secure such allocated memory against unauthorized read and write operations. SVMM 216 may be configured to initialize the allocated memory after protection of the memory is established to eliminate the opportunity for malware to add malicious code between the time when the memory is allocated by in-O/S security agent 218 and the protection is established by SVMM 216.

SVMM security agent 217 may be configured to communicate with protection server 202 to securely receive SVMM security rules 222. SVMM security rules 222 may comprise instructions, logic, rules, shared libraries, functions, modules, or any other suitable mechanism for instructing SVMM 216 about what security policies to employ. SVMM security agent 217 may be configured to transfer information to protection server 202 regarding suspicious activities and detected malware from electronic device 204.

In-O/S security agent 218 may be configured to communicate with protection server 202 to receive in-O/S security rules 220. In-O/S security rules 220 may comprise instructions, logic, rules, shared libraries, functions, modules, or any other suitable mechanism for in-O/S security agent 218 to detect malware on electronic device 204. In-O/S security agent 218 may be configured to transmit information to protection server 202 regarding suspicious activities and detected malware on electronic device 204.

In-O/S security rules 220 and SVMM security rules 222 may each comprise protection rules for protecting electronic device 204 against malware infections, and for detecting suspicious activities that may comprise malware. In-O/S security agent security rules may contain rules executed by and within in-O/S security agent 218. SVMM security rules 222 may contain rules executed by and within SVMM 216 and/or SVMM security agent 217.

SVMM security rules 222 may be configured to provide information to SVMM security agent 217 with definitions of how to observe and detect malware infections of electronic device 204. For example, SVMM security rules 222 may include categorizations of what types of function calls or behaviors from entities such as application 210 or driver 211 that SVMM security agent 217 may monitor for indications of malware. As another example, SVMM security rules 222 may include definitions of how SVMM security agent 217 may process such triggered function calls, including what parameters to use, how to extract values from such calls, or how to validate the operation of such calls. Furthermore, SVMM security rules 222 may include information for in-SVMM security agent 217 on how to monitor the behavior of entities electronic device such as application 210 or driver 211, as well as exceptions to such behavioral detection rules. As yet another example, SVMM security rules 222 may include information for SVMM security agent 217 on how to prevent and repair malicious behaviors detected by such behavioral detection rules. SVMM security rules 222 may include details of what data that SVMM security agent 217 should monitor, collect, and send to protection server 202.

Similarly, in-O/S security rules 220 may be configured to provide information to in-O/S security agent 218 with definitions of how to observe and detect malware infection of electronic device 204, as well as how to coordinate such activities with SVMM security agent 217.

SVMM security rules 222 may also include rules regarding what actions SVMM 216 will trap. SVMM security agent 217 may be configured to apply such rules to SVMM 216. For example, SVMM security agent 217 may be configured to convert the address for a function to be trapped into an identifiable virtual or physical page of memory, create a request for SVMM 216 to trap the execution of such a page, and subsequently call the security agent 217 after trapping the execution. SVMM security agent 217 may be configured to receive SVMM security rules 222 through its interface with the SVMM 216. Such an interface may comprise a hypercall-based interface. SVMM security agent 217 may be configured to push any resulting detections or reports to SVMM 216 through the same hypercall based interface.

In one embodiment, SVMM 216 may be configured to process triggered actions without consulting SVMM security agent 217. In such an embodiment, SVMM 216 may be configured to install additional triggers that are processed within SVMM 216 which might not be passed to SVMM security agent 217. Such additional triggers may be defined by SVMM security rules 222. In one embodiment SVMM security rules 222 may define memory pages scanning rules for SVMM 216. Such rules may include a listing of entities or modifications which are malicious and should not be allowed to reside in memory. Such rules may also include a whitelist, configured to include a listing of pages that are specifically allowed to exist within system memory 228. In another embodiment, SVMM security rules 222 may define to the SVMM 216 memory pages access rules. Such rules may include definitions of what code pages are allowed, or conversely, prohibited to access a given code or data page. Consequently, SVMM security rules 222 may be configured to instruct SVMM 216 to act as a memory scanner, and/or control access to memory pages.

SVMM 216 may be configured to protect SVMM security agent 217, SVMM 216, and in-O/S security agent 218 by preventing unauthorized read and write access to their respective code and data pages in system resources 214. For example, if application 210 or driver 211 make a request to a portion of system memory 228, processor registers 230 or I/O devices 226 which would result in affecting the integrity or operation of SVMM security agent 217, SVMM 216, and in-O/S security agent 218, then SVMM 216 may be configured to intercept such an attempted request, and subsequently re-route the request, deny it, or take other appropriate action. In another example, SVMM 216 may be configured to authorize read access for portions of system memory 228, processor registers 230 or I/O devices 226 affecting SVMM security agent 217, SVMM 216, and in-O/S security agent 218 for memory security software applications, such as SVMM security agent 217 itself, or other corresponding or affiliated programs. Such an authorization may be defined within SVMM security rules 222, which may define to SVMM 216 how to handle access to system resources 214 such as system memory 228. In one embodiment, SVMM security rules 222 may include a whitelist of trusted security programs, which may include SVMM security agent 217.

To communicate with protection server 202, SVMM 216 may include a secured network interface 224. Secured network interface 224 may be configured to provide secure access between a network server such as protection server 202 and an element of electronic device 204 such as SVMM 216 or SVMM security agent 217. SVMM 216 may include a logical TCP/IP driver or other communication interface, which may implement secured network interface 224. The protection server 202 may be configured to communicate via secured network interface 224 to instruct SVMM 216 or SVMM security agent 217 to update itself, as well as provide protection rules such as SVMM security rules 222 or in-O/S security rules 220. Protection server 202 may be configured to deliver customized rules for a particular electronic device 204, or a particular SVMM 216. Such customization may include the type of malicious activities that have been reported on electronic device 204, along with other protection mechanisms within electronic device 204 such as an anti-virus program, firewall, or other protection mechanism. In one embodiment, protection server 202 may be operated by an administrator of electronic device 204 on, for example, a local network. In such a case, the administrator may set global or personalized policies for handling suspicious behavior that may be implemented by rules received from protection server 202. SVMM 216 may include an update engine that informs SVMM 216 or SVMM security agent 217 how to update itself through a new image delivered securely via protection server 202.

In-O/S security rules 220 and SVMM security rules 222 may each be configured to request that particular or classes of observed actions or operations on electronic device 204 be passed to protection server 202. There, protection server may examine and verify the observations before the action is allowed to proceed on electronic device 204. Protection server 202 may be configured to accept such an action to be examined synchronously or asynchronously. In one embodiment, in-O/S security agent 218 may be configured to pass questionable activities, segments of code or data, or actions to SVMM 216 for verification by protection server 202. For example, in-O/S security agent 218 may detect a suspected instance of malware by detecting an unsigned driver loaded within memory. SVMM 216 may receive the information about the suspicious software from in-O/S security agent 218, and may provide it to protection server 202.

SVMM security rules 222 may be configured to allow or deny access to any suitable system resource of electronic device. Such resources available to be monitored may depend upon the resources exposed by processor 206. For example, in one embodiment SVMM security rules 222 may be configured to allow SVMM 216 to restrict access to system memory 228, I/O devices 226, and interrupts 140. Such a restriction may prevent unauthorized access to I/O devices such as keyboard displays or removable discs. In another embodiment, SVMM security rules 222 may be configured to allow SVMM 216 to restrict access to interrupt descriptor table entries, including entries in processor registers such as interrupt 240. In yet another embodiment, SVMM security rules 222 may be configured to allow SVMM 216 to restrict access to Extended Page Tables ("EPT"), or any other mechanism handling the mapping of virtual memory (real memory from the perspective of a guest operating system) to host physical memory.

If electronic device 204 contains one or more processors besides processor 208 that support virtualization, SVMM 216 or another instance of SVMM 216 may be configured to intercept attempts to access the virtualized resources of such other processors. If electronic device 204 contains, for example, a quad-processor containing processor 208, the resources of the quad-processor may be protected by SVMM 216. If the one or more other processors do not support virtualization, SVMM 216 might not be able to secure access to their resources. If the one or more other processors support a different virtualization technology from processor 208, SVMM 216 may be configured to secure access to their resources if SVMM 216, but in a different manner than as processor 208 is secured, since the manner in which resources are virtualized may differ.

In operation, protection server may be running on network 244. In-O/S security agent 218 may be running on electronic device 204 to protect electronic device 204 from malware infections, by scanning electronic device 204 for malware, observing the behavior of entities such as application 210 and driver 211 on electronic device 204 for suspicious behavior, and by repairing any such infections that were found. In-O/S security agent 218 may be running at the same priority or level as operating system 212, and may be running in operating system 212. SVMM 216 may be operating on electronic device 204 to protect electronic device 204 from malware infection by trapping the attempted access of system resources of electronic device 204. SVMM security agent 217 may be running on electronic device 204, or another suitable electronic device, to set the trapping operation of SVMM 216 and to handle some or all of the trapped attempted accesses of system resources. SVMM 216 and SVMM security agent 217 may be running below the operating system 212 with a priority of "Ring −1." SVMM security agent 217 may be running on SVMM 216.

Protection server 202 may send security rules, such as SVMM security rules 222 and in-O/S security rules 220, to electronic device 204. Such rules may be received by SVMM security agent 217, which may provide in-O/S security rules 220 to SVMM 216. Such rules may be received by in-O/S security agent 218.

Protection server 202, security agent 218 and SVMM security agent 217 may each authenticate each other. SVMM security agent 217 may locate the image of security agent 218 in memory and use cryptographic signing algorithms to verify the image of security agent 218 resident in memory. Protection server 202 and SVMM security agent 217 may authenticate each other using cryptographic hashing and signing algorithms to correctly identify each other. SVMM security agent 217 and protection server 202 may also exchange a private secret key to authenticate the identity of each other. Security agent 218 may receive a secret key from protection server 202 to verify the instance of SVMM security agent 217. Communication between security agent 218, SVMM security agent 217, and 202 may not be fully established unless each of the agents is authenticated with each other. Similarly, SVMM security agent 217 and SVMM 216 may verify and authenticate each other if they are running as separate entities.

SVMM 216 and SVMM security agent 217 may be running underneath operating system 212 and all operating systems of electronic device 204. SVMM 216 may monitor access to system resources 214, including I/O devices 226, system memory 228, and processor registers 230 by operating system 212, security agent 218, application 210, and driver 211. SVMM 216 may trap the execution of key operations requested by operating system 212, security agent 218, application 210, driver 211, or any other entity of electronic device 204. SVMM 216 may trap such execution by manipulating flags inside of VMCS 221. When VMCS 221 intercepts a request for a protected resource, operation may be handed off to SVMM 216 for further operation, diagnosis and repair. In one embodiment, operation may be subsequently handled by SVMM security agent 217. In another embodiment, handling of the trapped operation may be conducted by SVMM 216 itself. SVMM 216 may trap any necessary operation of electronic device 204 to provide protection against malware. Such operations may include, but are not limited to: reading, writing and execution of particular code or data pages in system memory 228; loading and storing of value from a system register and processor registers 230; or reading to or from I/O devices 226. The specific operations which will be trapped by SVMM 216 may be defined by SVMM security rule 222.

Protection server 202 may communicate with SVMM security agent 217 or in-O/S security agent 218 to provide security rules to each. In one embodiment, protection server 202 may deliver SVMM security rules 222 to SVMM security agent 217. In another embodiment, protection server 202 may deliver in-O/S security rules 220 to in-O/S security agent 218. In yet another embodiment, protection server 202 may deliver in-O/S security rules 220 to SVMM security agent 217, which may then provide the rules to in-O/S security agent 218.

Application 210, driver 211 or other entities operating an electronic device 204 may be observed by in-O/S security agent 218. In-O/S security agent 218 may use in-O/S security rules 220 to observe the behavior of such processing entities to determine whether their behavior constitutes suspicious behavior indicating a possible infection of malware. Upon such a detection of suspicious activities, in-O/S security agent 218 may provide the suspicious information to protection server 202 for further analysis and instruction. In-O/S security rules 220 may indicate to in-O/S security agent 218 that such behaviors are suspicious, as well as indicate corrective action. For example, application 210 may communicate with a network destination which is known to host malware. In-O/S security agent 218 may notice the activity of application 210, and subsequently block the network access of application 210 to the network destination. In-O/S security agent 218 may also scan electronic device 204 for malware. For example, in-O/S security agent 218 may examine the contents of memory 206, or system memory 228 for patterns that correspond to signatures of malware. Such an examination may reveal that, for example, application 210 contains a block of code corresponding to a known segment of malware. In-O/S security agent 218 may then clean electronic device 204 of the infection of malware by repairing application 210, removing application 210, or taking any other suitable action. In-O/S security agent 218 may communicate with protection server 202 regarding any detected suspicious behaviors, or other indications of malware, and may receive instructions from protection server 202 on how to deal with such malware.

In one embodiment, SVMM security agent 217 may be configured to evaluate a trapped operation based on the origin of the entity that made the attempted operation. For example, if a driver was downloaded from an unknown domain, or has a certificate from an unknown guarantor, then the ability of the driver to subsequently operate may be limited. For example, a driver whose status is unknown may be denied the ability to attach itself to another driver. If the driver was downloaded from a domain known to host malware or contains fraudulent credentials, then the driver may be not permitted to even load. Similarly, if a driver is known to be from a particular domain or created by a particular author, then SVMM security agent 217 may be configured to recognize services in electronic device 204 authorized to update the driver, and to limit the ability to write or access the driver to those services. For example, a kernel driver from Company X may only be written to from Company X's update service software resident on electronic device 204. SVMM security agent 217 may be configured to validate the operation and integrity of the update service. In another embodiment, SVMM security agent 217 may be configured to evaluate a trapped operation based on the target of the attempt. For example, an attempt to update software from a service may be trapped for kernel drivers, but not for application software.

Once an entity has been determined to be suspicious, or an attempt determined to indicate malware, the process causing the attempt and the memory housing the process may be linked. Other processes accessing the same portion of memory may similarly be determined to be malware. A trapped attempt to access a resource may be stored, and a subsequent attempt to access a protected resource may be evaluated in light of the original event. For example, a malicious operation may require that code be written to a data segment then executed. Thus, SVMM security agent 217 may trap the original write access to the data segment, allow the write, but record the source of the write access. Subsequently, SVMM security agent 217 may trap a subsequent attempt to execute the data segment, and evaluate the malicious status of the attempt in light of the previously trapped operation, the entity which attempted it, or other suitable forensic information.

SVMM security agent 217 may instruct SVMM 216 concerning which of system resources 214 that SVMM 216 is to trap through a control structure such as VMCS 221. SVMM 216 may then trap access requests to system resources 214 originating from entities of electronic device 204 such as operating system 212, application 210 or driver 211. For example, if a request is made to read, write or execute portions of system memory 228, SVMM 216 may intercept such a request through a flag set for the designated portion of system memory in VMCS 221. In another example, access requests made of I/O devices 226 may be intercepted by VMCS 221, such as input or output operations. In yet another example, requests of process registers 230, such as load or store commands, may be trapped by VMCS 221. Any such traps may result in the notification of SVMM 216 of the attempted access. Once SVMM 216 has trapped an attempted operation upon system resources 214, SVMM 216 may communicate such a trapped execution to SVMM security agent 217.

In-O/S security agent 218 and SVMM security agent 217 may communicate to determine the context of operations conducted within operating system 212. For example, a trapped system call from operating system 212 to a particular resource of electronic device 204 may have originated from a particular part of memory. SVMM security agent 217 may communicate with in-O/S security agent 218 to determine what application, process, or other entity resides within the particular part of memory.

Based on SVMM security rules 222, and the trapped operation and/or contextual information from in-O/S security agent 218, SVMM security agent 217 may then determine whether such an access constituted a suspicious action such as those indicative of an infection of malware. For example, an attempted change of system memory 228 of a protected memory space by an unauthorized application may be a suspicious activity, and thus such an attempted change detected by SVMM 216 may be interpreted by SVMM security agent 217 to be an operation of malware. Such an activity may be reported to protection server 202 for further instruction, or action may be directed by in-O/S security rules 220. The result of such a detection may be to block the attempted change in system memory 228, or triggering additional cleaning operations upon the entity of electronic device 204 which generated the attempted change.

SVMM 216 may monitor additional calls to system resources 214 to protect the integrity of the SVMM 216, SVMM security agent 217 and/or in-O/S security agent 218. SVMM 216 may conduct scanning operations, defined by SVMM security rules 222, to scan portions of system memory 228 to determine whether portions of such memory have been modified by malware. SVMM 216 may make use of signatures, hashes, or other rules indicating that a given pattern of memory is known as unsafe or safe.

For example, SVMM 216 may protect in-O/S security agent 218 by preventing unauthorized read and write access to code and data pages corresponding to in-O/S security agent 218 in system memory 228. Some malware may attempt to attack in-O/S security agent 218 by making memory modifications or other modifications to system resources 214 associated with system memory 228. SVMM 216 may read a whitelist contained in SVMM security rules 222 of authorized applications and other entities of electronic device 204 that may be permitted to alter the code or data or other system resources 214 corresponding to in-O/S security agent 218. If a modification originates from an entity not contained within the whitelist, then SVMM 216 may determine that such a modification is associated with malware. Unauthorized access to system resources 214 corresponding to in-O/S security agent 218 may be handled by SVMM in any suitable manner, including blocking access, creating a honeybot process, reporting violations to protection server 202, or any other suitable remedy.

SVMM 216 may also trap access to system resources 214 belong to other entities of electronic device 204. For example, a target memory page in system memory 228 may contain sample code or data belonging to a part of the kernel operation of operating system 212. SVMM 216 and SVMM security rules 222 may limit access to such a target page to only code sections that are authorized. Consequently, if a code page in system memory 228 attempts to read or alter the target memory page, and the code page belongs to a non-authorized entity of electronic device 204, such an access may be blocked by SVMM 216. Thus, SVMM 216 may act to control access to memory pages in system memory 228.

SVMM security agent 217 may be able to update SVMM security rules 222 or in-O/S security rules 220 by contacting protection server 202 for updated rules. Protection server 202 may configure the rules to be delivered to SVMM security agent 217 based upon the particular malware observed, administrator settings, or other characteristics of electronic device 204. SVMM security agent 217 may update the rules of electronic device 204 upon demand by a user, periodically, or upon the occurrence of a significant event, such as the encounter of new suspicious activities that may be linked to malware.

SVMM security agent 217 may set flags in VMCS corresponding to compound conditions. Such flags may span across different types of resources to be trapped. For example, VMCS may be configured to trap the combination of a write of a certain value to page in memory, and a subsequent move of the page to a buffer of an I/O device.

System 200 may contain one or more advantages over other implementations of anti-malware systems and software. For example, some anti-malware solutions may hook various portions of an operating system to trap and evaluate low-level operations of the applications. However, these solutions themselves may operate inside of the operating system, or in another operating system in the case of two guest operating systems. By operating within the confines of the operating system, even at a kernel-level priority, the anti-malware solution may be susceptible to malware attacks from malware also running on the same operating system, perhaps running at the same priority. If trapping or triggering upon certain events is conducted at the level of an operating system, such trapping or triggering may be phished, hooked, reverse engineered, compromised, or otherwise defeated by malware running at the same or lower priority for the operating system. For example, an anti-malware solution running on an operating system that detects and removes a malicious hook in the operating system may be observed by malware running at the same priority. In another example, an anti-malware solution registering as a filter driver to detect the operation of a certain routine may be defeated by malware that registers a malicious filter driver lower on the driver stack than the anti-malware solution. Similarly, if handling of certain trapped or triggered events occurs at the level of an operating system, malware may be able to affect the such handling. For example, the malware may undo the corrections of the anti-malware solution, or even disable the operation of the anti-malware solution.

In another example, hypervisors may work to virtualize access to system resources such as system memory 228, but may not conditionally guard access to the system resources and thus act as a security hypervisor. Such hypervisors may not have access to anti-malware rules, such as behavioral rules in security rules 222, to identify malicious activities, entities, or malicious attempted access of system resources. Such hypervisors may be running within an operating system themselves, which may be prone to malware running at the same priority level as the operating system. Such hypervisors may not be running in a "Ring0 privileged mode," because such a mode may require the hypervisor to intercept too many attempted accesses of system resources. The hypervisor may be tasked with virtualizing all aspects of a guest operating system, and the demands of such virtualization may be too expensive to simultaneously access security rules to check for malicious behavior.

Figure 3:
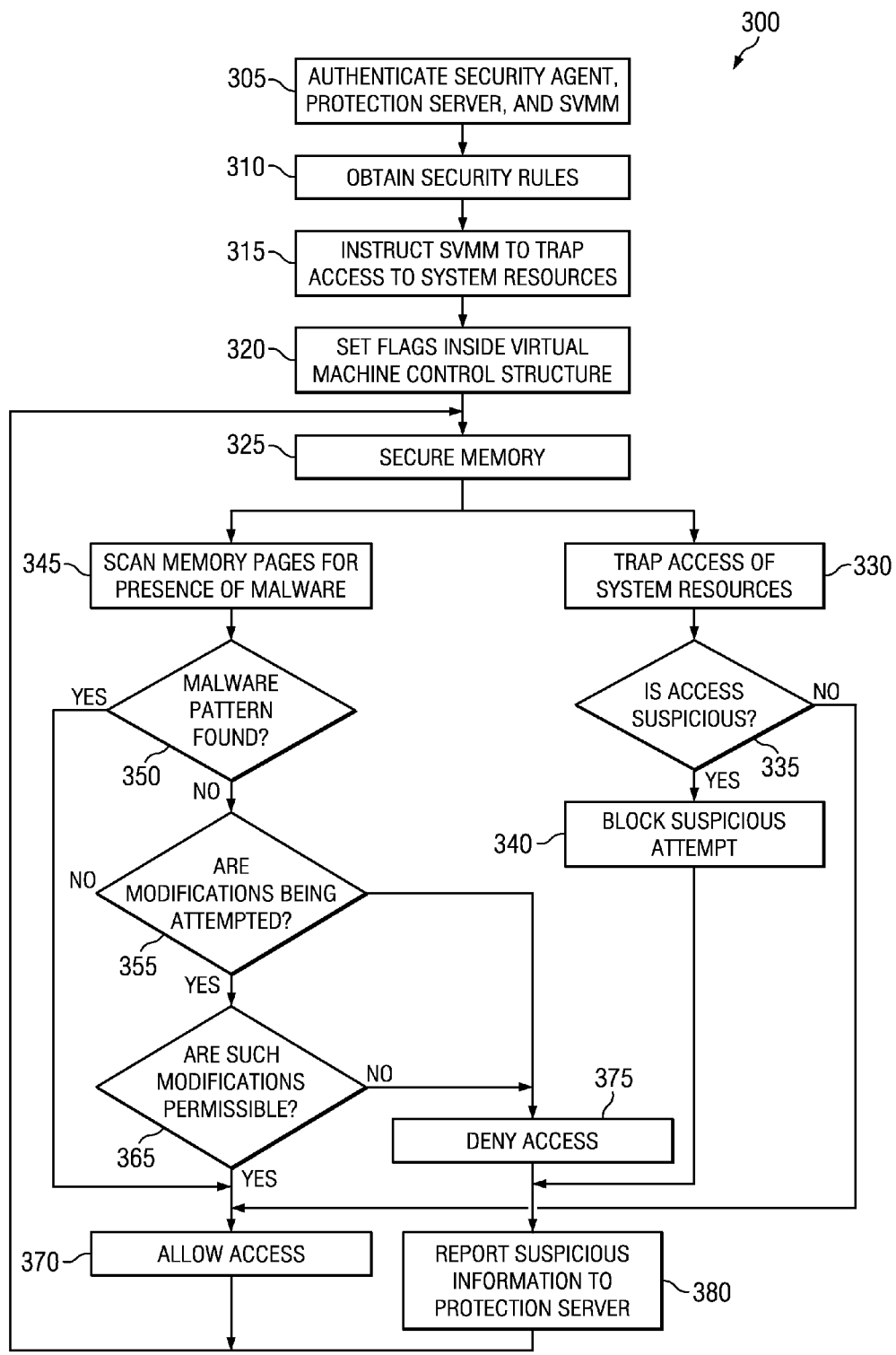
FIG. 3 is an example embodiment of a method for virtual machine monitor-based protection for an electronic device from malware.

FIG. 3 is an example embodiment of a method 300 for virtual machine monitor-based protection for an electronic device from malware. In step 305, the identity and security of a below-O/S security agent, in-O/S security agent, protection server, and virtual machine monitor may be authenticated. Such authentication may be done through any suitable method, including by locating and verifying the images of each located in memory, cryptographic hashing, or secret keys. Until step 305 is completed, operation of other steps may be withheld.

In step 310, a protection server may be accessed to determine security rules. Such security rules may be used to make decisions in steps 315-380. In step 315, the virtual machine monitor may be instructed to trap access to system resources. Such access may arise from applications, drivers, or operating systems running on the electronic device. The virtual machine monitor may be instructed as to what system resources of the electronic device are to be monitored. The virtual machine monitor may also be instructed as to what operations on the monitored system resources are to be trapped. For example, read, write or execute operations on system memory may be trapped. In another example, load or store operations on registers may be trapped. In yet another example, input or output actions on I/O devices may be trapped.

In step 320, flags corresponding to such operations to be trapped may be set inside a control structure such as a virtual machine control structure. Such trapped operations may generate a VM exit, wherein a triggered event is created upon the access of the flagged resource. In step 325, as system memory is allocated for the virtual machine monitor, the in-O/S security agent, and the below-O/S security agent, such memory may be secured against unauthorized read and write operations.

The electronic device may operate and be protected by one or more of the trapping of access of system resources in steps 330-340, scanning memory for the presence of malware in steps 345-355, and scanning memory for attempted memory modifications in steps 360-365. Each of trapping the access of system resources, scanning memory for the presence of malware, and scanning memory for attempted memory modifications may be conducted in parallel. Further, each of these may be repeated as necessary to protect the operation of the electronic device.

In step 330, the access of a system resource such as system memory, registers, or I/O devices may be trapped. The access may be trapped using a VMCS flag generating a VM exit.

Such trapping may be conducted below the level of operating systems running on the electronic device. In step 335, the access may be analyzed to determine whether the requesting entity has permission to access the requested resource. Contextual information associated with the attempted access may be accessed to make such a determination. Security rules may be accessed to make such a determination. An unauthorized access may be determined to be suspicious. Such handling and determinations may be made below the level of operating systems running on the electronic device. If the access is suspicious, then in step 340, a suspicious attempted access of the system resources may be blocked. Such an attempt may be reported to the protection server. If the access is not suspicious, then the access may be allowed in step 370.

In step 345, memory pages of the electronic device may be scanned for the presence of malware. While scanning the memory of electronic device, a whitelist may be used to determine whether patterns of memory, reflecting entities resident on electronic device, are known to be safe. If a pattern of memory known to be safe is encountered, then in step 370, the memory may be allowed to continue to have access to electronic device and may remain. While scanning the memory of electronic device, a blacklist may be used to determine whether patterns of memory are known to comprise or be associated with malware. The whitelist and blacklist may be accessed by accessing the security rules. In step 350, if a pattern of memory known to be associated with malware is found, then in step 375 the pattern of memory may be denied access to electronic device by being repaired, removed, or neutralized.

In step 355, memory may be scanned to determine whether modifications to memory have been or are being attempted. Such scanning may be conducted below the level of operating systems in the electronic device. Such memory may include kernel memory, system data structures, or any other portion of memory of the electronic device that may be modified by malware. For example, a list of active threads running on the electronic device may be modified to hide the presence of a malicious process. If a modification is detected, then in step 365 it may be determined whether such modifications are permissible. Whether such modifications are permissible may be defined by the security rules. For example, the code or data page of an anti-malware process may be protected against modification or access by any other process. If the memory modification is deemed as authorized, then in step 370, the modification may be allowed. If the memory modification is determined to be unauthorized and not allowed, then in step 375, the modification may be denied.

In step 370, if an access or modification is allowed, then the access or modification may be stored for later reference. Some detections of malware may utilize information regarding past accesses or modifications to determine whether such past access and a presently detected access together comprise a malicious access of a resource.

In step 375, if a modification, access, or other operation is denied, then such an event may be reported to the protection server in step 380. Such a report may include information regarding any associated malware or suspicious behavior.

The steps of method 300 may be repeated as necessary to protect the electronic device continuously, periodically, or upon demand.

FIG. 4 is an example embodiment of a firmware-based and security-rule-based system 400 for protecting of an electronic device 404 from malware. System 400 may be an example embodiment of system 100, wherein certain elements of system 100 are implemented in firmware. The trapping operations of system 400 may be conducted below the level of operating systems of electronic device 404. System 400 may include one or more below-O/S security agents configured to trap requests, such as I/O commands, for use or access to resources of the electronic device 404. Such below-O/S security agents may be configured to manage the exchange of input and output data between devices or with the main processor of electronic device 404. Such below-O/S security agents may be embodied in firmware of components, such as device controllers, of electronic device 404 or in the firmware of electronic device 404 itself. Such firmware may reside in non-volatile memory. Such resources of electronic device 404 may include the system resources 106 of FIG. 1 or its various possible embodiments, or resources coupled to or embodied by devices in system 400. System 400 may include one or more below-O/S security agents configured to trap attempted use of access to the resources of the electronic device 404, generate a triggered event corresponding to the attempt, consult security rules regarding the triggered event, and take corrective action if necessary regarding the attempt.

In one embodiment, the below-O/S security agents of system 400 may be embodied only in firmware of components of electronic device 404, as described below and in the discussions of FIG. 5. In another embodiment, the below-O/S security agents of system 400 may be embodied in firmware of electronic device 404 itself such as main PC firmware 428. In such an embodiment, main PC firmware 428 may be implemented on a motherboard of electronic device 404. In yet another embodiment, the below-O/S security agents of system 400 may also be embodied in below-O/S agent 450. Below-O/S agent 450 may be implemented in any suitable manner for providing triggering of access of resources, or handling of such triggers, below the level of operating systems of electronic device 404 such as operating system 412. For example, below-O/S agent 450 may be an embodiment of SVMM 216 or SVMM security agent 217 of FIG. 2. Below-O/S agent 450 may include security rules 422.

Electronic device 404 may include one or more components for conducting input and output operations from electronic device 404. Electronic device 404 may include any suitable number of such components and types of components. Such components may be implemented by devices with their own processor, memory, and software embedded in firmware. An example embodiment of such a component may be the I/O device 502 of FIG. 5.

Electronic device 404 may include, for example, display 424 and storage 426. Each such component 424, 426 may include firmware 430, 432. Firmware 430, 432 may each embody the firmware 504 of FIG. 5. As described above, each such component 424, 426 may include a firmware-based security agent, such as firmware security agent 440, 442. Firmware security agents 440, 442 may each partially or fully embody the firmware security agent 516 of FIG. 5. In one embodiment, each of firmware security agents 440, 442 may be implemented in their respective firmware 430, 432. In another embodiment, each of firmware security agents 440, 442 may be implemented outside of firmware 430, 432 in each of their respective components 424, 426. Each of such device firmware security agents 440, 442 may be communicatively coupled to a respective set of security rules 434, 436. Each such security rules 434, 436 may embody the security rules 518 of FIG. 5.

Electronic device 404 may include firmware. In one embodiment, electronic device 404 may include main PC firmware 428. Main PC firmware 428 may be embodied by a Basic Input/Output System ("BIOS"). In one embodiment, main PC firmware 428 may be configured as the BIOS of a computer. In such cases, main PC firmware 428 may be configured to initialize the operation of the processor 406 of the computer. Main PC firmware 428 may be configured to allow the main processor 406 to communicate with I/O devices such as display 424 and storage 426. In such embodiments, the computer may also contain a programmable I/O controller, which may be programmed by the firmware or BIOS, and communicates with the firmware of the I/O devices such as 424 and storage 426.

Main PC firmware 428 may include a below-O/S security agent. In one embodiment, main PC firmware 428 may include a PC firmware security agent 444. PC firmware security agent 444 may be configured to intercept requests of system resources 414. To accomplish such functionality, PC firmware security agent 444 may embody fully or in part the functionality of the SVMM security agent 217 or SVMM 216 of FIG. 2, and/or firmware security agent 516 of FIG. 5. PC firmware security agent 444 may embody the functionality of SVMM security agent 217 or SVMM 216 of FIG. 2 to accomplish below-O/S triggering and handling of access to system resources 414, verification and validation of below-O/S agents and in-O/S security agents such as in-O/S security agent 418, and distribution of security rules such as security rules 420, 422. PC firmware security agent 444 may embody the functionality of firmware security agent 516 of FIG. 5 to accomplish below-O/S triggering and handling in firmware, updating of security rules, and to evaluate IN and OUT commands sent to portions of electronic device 404.

Electronic device 404 may include security rules 438. Security rules 438 may be an example embodiment of the security rules 114 of FIG. 1. In one embodiment, security rules 438 may reside in main PC firmware 428. In another embodiment, security rules 438 may reside outside main PC firmware 428, and PC firmware security agent 444 may be coupled to security rules 438.

The security agents of system 400 may be configured to work together to prevent malware and its malicious operations. Attempted access of resources may be trapped, and subsequent events triggered for handling in firmware security agents in devices such as display 424 or storage 426, or in main PC firmware 428. The firmware security agents in such devices or firmware may be configured to handle the triggered events or to pass the triggered event to another security agent for handling. Due to limited execution and update capabilities, some firmware security agents may be limited in handling their own triggered events, and thus it may be advantageous to pass such triggered events to other security agents. The security agents to which firmware security agents may pass events may include, for example, in-O/S security agents such as in-O/S security agent 418, a below-O/S security agent such as below-O/S security agent 450, or another firmware security agent such as PC firmware security agent 444. These other security agents may be configured to receive the triggered event, consult security rules, contextual information, or permissions, and send back a resulting action to be implemented.

Accordingly, while FIG. 4 illustrates an example number of elements for conducting below-O/S triggering and handling by firmware-based security agents, more or less elements may be used in various embodiments. As more or less elements are used, the functionality of each element and of system 400 may change accordingly. In one embodiment, the security agents of system 400 below the level of the operating system 412 may be limited to one or more in-O/S security agents 418 and firmware security agents 440, 442. In such an example, the firmware security agents 440, 442 may rely upon protection server 402 for updates to security rules 434, 436. Firmware security agents 440, 442 may rely upon in-O/S security agent 418 for updates or handling of triggered events, but the operation of the in-O/S security agent 418 may be less secure unless a below-O/S security agent validates in-O/S security agent. Firmware security agents 440, 442 may provide triggering based upon firmware security rules 434 established at installation, manufacture, or configuration. Such security rules may be relatively static. In such a case, firmware security agents 440, 442 may be configured to provide relatively basic event triggering, with little analysis. Such firmware security agents 440, 442 may nonetheless be useful, as such triggering is accomplished below the operating systems of electronic device 404, thus better detecting some malicious or suspicious operations.

In another embodiment, the security agents of system 400 may include either PC firmware security agent 444 or below-O/S agent 450, but not both. In such a case, the functionality of PC firmware security agent 444 may be implemented by below-O/S agent 450, and vice-versa. Either PC firmware agent 444 or below-O/S agent 450 may be coupled to protection server 402 and configured to obtain information such as security rules 420, 422, 438, 434, 436, and to share such information with other security agents in system 400. Such security rules may be tailored to each respective security agent for the purposes of communication, update, or storage expense. Either PC firmware agent 444 or below-O/S agent 450 may be configured to receive triggered events from other security agents such as firmware security agents 440, 442, apply security rules and other information, and take corrective action such as sending a resulting event to the firmware security agents 440, 442 or information to protection server 402. Either PC firmware agent 444 or below-O/S agent 450 may be configured to trap attempted accesses of system resources 414. Either PC firmware agent 444 or below-O/S agent 450 may be configured to communicate with in-O/S security agent 418 to determine the context of triggered events. If more than one in-O/S security agent 418 is present in system 400, each in-O/S security agent 418 may be configured to perform a designated portion of the trapping, validating, or other tasks associated with in-O/S security agent 418. Such portions may be defined by below-operating-system security agents. For example, one in-O/S security agent 418 may validate or investigate MOV instructions, while another in-O/S security agent 418 may validate or investigate JMP instructions.

In yet another embodiment, security agents of system 400 may include both PC firmware security agent 444 and below-O/S agent 450. Nevertheless in such an embodiment, some or all of the functionality of PC firmware security agent 444 may be implemented by below-O/S agent 450, and vice-versa. The delineation of tasks between PC firmware security agent 444 and below-O/S agent 450 may take into account several factors. For example, the operation of a security agent within firmware such as PC firmware security agent 444 may be more secure than the operation of another below-O/S agent 450. However, updating the security rules and the software of below-O/S agent 450 may be simpler and faster than in a PC firmware security agent 444.

In still yet another embodiment, one or more firmware security agents 440, 442 may reside on system 400 independent of a PC firmware security agent 444 or a below-operating system agent 422. In such an example, the firmware security agents 440, 442 may validate the instance of in-operating system security agent 418.

Each of firmware security agents 440, 442, 444 may be configured to reside within firmware logic sufficient to be able to monitor and control firmware logic for external communication. Firmware security agents 440, 442, 444 may thus be configured to trap and/or the communication of specific information or with specific other entities. Firmware security agents 440, 442, 444 may be configured to determine the operation request received, as well as the data to be sent or received. Furthermore, firmware security agents 440, 442, 444 may be configured to control the data to be sent or received, and may be configured to cause additional operations on the data, such as encryption, compression, embedding of watermarks, or decoding of watermarks in the data. Other security agents of system 400 in communication with firmware security agents 440, 442, 444 may be configured to embed watermarks in data to be trapped by firmware security agents 440, 442, 444, or to decode watermarks put into data by firmware security agents 440, 442, 444.

Communication with a firmware security agent 440, 442 or PC firmware security agent 444 may be conducted, for example, through programmable input-output interrupts or programmable input-output registers. Such interrupts or registers may be defined and provided by the maker of the firmware or device in which the firmware security agent 440, 442, 444 resides.

One or more of the below-O/S security agents of system 400 may be configured to serve as a main security agent to coordinate the anti-malware activities of the firmware-based security agents of electronic device 404. In one embodiment, PC firmware security agent 444 may be configured as the main security agent of system 400. In another embodiment, below-O/S agent 450 may be configured to serve as the main security agent. The security agent may be configured to handle triggered events from firmware security agents 440, 442. The main security agent may be configured to validate the operation of firmware security agents 440, 442, as well as other security agents such as in-O/S security agent 418. The main security agent may be configured to notify other security agents about whether one of the security agents has noticed suspicious behavior or detected malware, whether the system 400 is under a malware attack, or whether an administrator of system 400 has changed preferences or settings affecting security. The main security agent may share information about the attack with the other security agents of system 400.

By trapping access to resources of system 400 and/or handling the resulting triggered events below the level of the operating systems of system 400, system 400 may provide increased security against malware. Operation of a security agent in firmware may reduce the opportunity for malware to affect the operation of the security agent. Trapping operations in firmware or at the device level may reduce the ability of malware to spoof or phish elements of system 400 in order to disguise its operation. For example, no matter what portions of operating system 412 are compromised by malware, a request to a component 424, 426 might not be disguised from the device itself.

Figure 5:
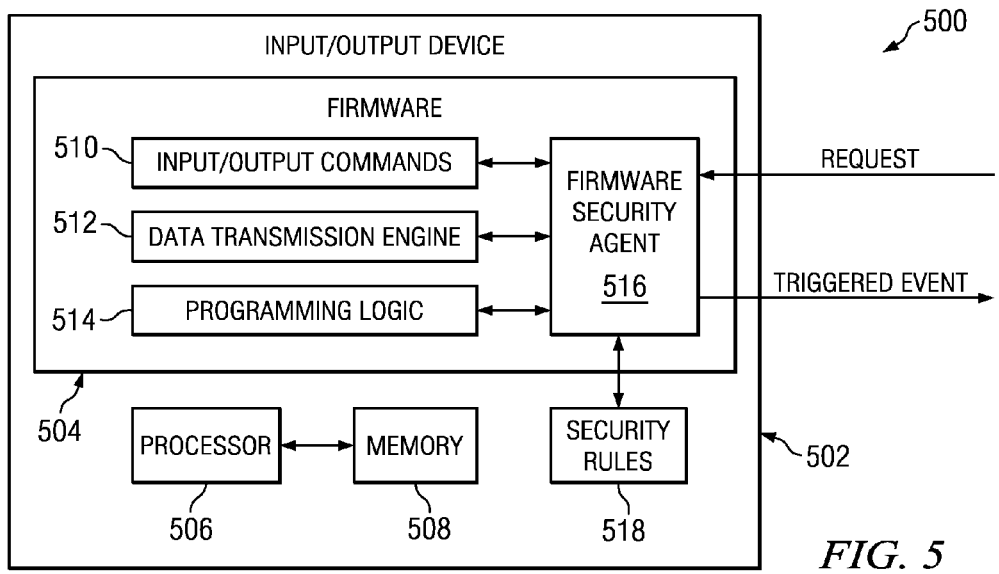
FIG. 5 is a more detailed view of an example embodiment of a firmware-based solution for protecting an electronic device from malware.

FIG. 5 is a more detailed view of an example embodiment of a firmware-based solution for protecting an electronic device from malware. A device such as I/O device 502 may be configured to receive and trap requests for use or access to resources of the device. In one embodiment, I/O device 502 may be configured to process such trapped requests to determine whether the requests indicate a presence of malware. In another embodiment, I/O device 502 may be configured to pass such a trapped request as a triggered event to another portion of a system in which I/O device resides. Such another portion of the system may include a below-O/S security agent. I/O device 502 may include firmware 504 and a processor 506 coupled to a memory 508, wherein the firmware 504 may include instructions that reside in memory 508 for execution by processor 506.

I/O device 502 may include any suitable portion of an electronic device for controlling access to a resource for the electronic device. In one embodiment, I/O device 502 may embody some or all of a peripheral for an electronic device. I/O device 502 may be embodied by, for example, a display controller card, computer bus controller, cache device, I/O controller device, disk controller, memory device, network controller, motherboard, or keyboard controller. I/O device 502 may reside in an electronic device. In one embodiment, I/O device 502 may be coupled to physical components. Such physical components may include, as just examples, a display, a computer bus, memory, I/O controllers, a disk, a network card, or a keyboard. In another embodiment, I/O device 502 may reside separately from the coupled physical components. For example, a keyboard controller may be coupled through a serial interface with a keyboard. In such embodiments, I/O device 502 may reside in an electronic device while such physical components may be communicatively coupled to the electronic device but reside outside the electronic device.

Firmware 504 may be configured to control the operation of I/O device 502. Firmware 504 may include a below-O/S security agent 516 configured to trap requests for resources, operate below the level of operating systems in I/O device 502 or in systems in which I/O device 502 resides. Below-O/S security agent 516 may be configured to handle events resulting from the trapped requests to determine whether to allow, deny, or otherwise handle the request, in order to protect I/O device 502 or systems in which I/O device 502 resides from malware. In one embodiment, firmware 504 may include a firmware security agent 516. Firmware security agent 516 may incorporate some or all of the functionality of SVMM 216 or SVMM security agent 217 of FIG. 2, but is embodied in firmware 504. In such a case, the functionality of SVMM 216 or SVMM security agent 217, such as trapping access to resources and/or handling the trapped request, may be conducted by firmware security agent 516. In one embodiment, firmware security agent 516 may be configured to reside in firmware 504.

Firmware 504 may include I/O commands 510, a data transmission engine 512, and programming logic 514. I/O commands 510 may include instructions for sending or receiving information to the device. Such commands may include variations of IN or OUT commands. The execution of I/O commands 510 may be operable to perform the desired actions of the device. Requests received by the device may be translated into I/O commands. Trapping or triggering upon particular requests for resources may be accomplished by trapping or triggering upon the associated I/O commands 510. Data transmission engine 512 may be configured to handle the communication of requests to the device, and subsequent responses. Data transmission engine 512 may be coupled to the processor 506 and to a programmable I/O controller over an I/O bus, over which I/O commands 510 and data are exchanged. Programmable logic 514 may be configured to provide instructions for firmware 504 to operate I/O commands 510 and data transmission engine 512. The programming logic 514 may be loaded into a processor such as processor 506.

Firmware security agent 516 may be configured to modify the operation of programming logic 514 to detect attempted malicious operations. Firmware security agent 516 may also be configured to monitor the communication of requests to the device to intercept requests of I/O device 502 through data transmission engine 512 and to determine whether such requests are malicious. Firmware security agent 516 may include a control structure in which flags may be set corresponding to operations that are to be trapped. In one embodiment, flags may be set in the structure according to memory address of commands which are to be trapped. Firmware security agent 516 may be configured to set flags for the interception of requests to I/O device 502. Such flags may correspond to, for example, specific commands of I/O commands 510 or such specific commands in combination with specific parameters. Such flags may be configured to intercept particular requests or categories of requests. Upon the triggering of a particular flag corresponding to a trapped attempted operation of an I/O command 510, firmware security agent 516 may be configured to process the event and take a resulting action, pass resulting information to another security agent through the data transmission engine 512, or pass the triggered event through data transmission engine 512.

I/O device 502 may also include security rules 518. Security rules 518 may implement some or all of security rules 222 of FIG. 2. Security rules 518 may be implemented in memory 508. In one embodiment, security rules 518 may reside outside of firmware 504. In another embodiment, security rules 518 may reside inside of firmware 504. Firmware security agent 516 may be communicatively coupled to security rules 518 and configured to access security rules 518 to determine what flags to set in firmware 504 to trap particular requests or categories of requests made to I/O device 502 for access to its resources. For example, firmware security agent 516 may be configured to access security rules 518 to determine whether a triggered event is malicious or not. In one embodiment, security rules 518 may contain instructions for firmware security agent 516 to process the triggered event. Firmware security agent 516 may be configured to use such instructions to determine whether to allow or deny the request, or to take another corrective action. In another embodiment, firmware security agent 516 may be configured to use such instructions to determine whether to report the request to another security agent. Such corrective actions may also include waiting for a response from the other security agent, which may contain instructions on whether to allow or deny the request.

In some embodiments, firmware security agent 516 may reside in firmware 504, which may make it relatively difficult to update firmware security agent 516. In addition, the ever-changing nature of malware attacks may require anti-malware solutions to be flexible. Consequently, firmware security agent 516 may use any suitable mechanism for receiving information for determining what requests to I/O device to trap, and what subsequent actions to take.

In one such embodiment, such a mechanism may include accessing security rules 518 as described above. Firmware security agent 516 may be configured to receive new and updated security rules 518 from other security agents or protection servers. To achieve flexibility, firmware security agent 516 may be configured to store security rules 518 in memory 508 separate from firmware 504, if—for example—storage of such rules in firmware 504 would make updating security rules 518 difficult.

In another such embodiment, firmware security agent 516 may be configured to update security rules 518 upon an update or flash of firmware. In such an embodiment, the flexibility of updating the requests to be trapped may be limited. Consequently, security rules 518 may be directed to very specific, protected resources. For example, security rules 518 of a disk device may include instructions to trap all write requests to the boot sector of the device. In some cases, where communication with other security agents is inexpensive, security rules 518 may include instructions to trap a wide variety of requests, wherein processing may be largely offloaded to other security agents.

In yet another such embodiment, firmware security agent 516 may be configured to receive instructions from other security agents. In one case such instructions may take the form of parameters to function calls of the firmware 504 or firmware security agent 516. For example, another security agent may call a function of firmware security agent 516 named "UpdateRule(trigger, action)" wherein a request to trap for is detailed in trigger and a subsequent action to take is detailed in action. Firmware security agent 516 may thus update security rules 518 by receiving instructions concerning updates to security rules. In another case, another security agent may write updates for security rules 518 to a reserved memory space of device 502 which may be subsequently accessed by firmware security agent 516. The instructions to be received from other security agents may also direct firmware security agent 516 to use specific sets of security rules 518. For example, during a time-critical operation firmware security agent 516 may be configured by such instructions to use a minimal, core set of security rules 518. If I/O device 502 is a disk device, such a minimal, core set of rules may include instructions to trap access to the boot sector of the disk. In another example, if time-critical operations are not being presently conducted, firmware security agent 516 may be configured by such instructions to employ rules from security rules 518 to trap a much broader range of access attempts and to send corresponding events to other security agents for handling.

Firmware security agent 516 may be configured to control I/O commands 510, scan content or data received or to be sent, and apply access control over the commands and content. Firmware security agent 516 may be implemented as an extension of existing device firmware.

The implementation of firmware security agents 516 may depend upon the type of device 502. For example, display devices and disk devices may trigger on different kinds of content or attempted commands. The creation of firmware security agents 516 in various devices may be tailored to the specific kind of interface with the device. For example, if device 502 is configured to communicate through a Serial Advanced Technology Attachment ("SATA") bus, it may be equipped with firmware security agents 516 similar to other devices communicating through SATA busses. Firmware security agent 516 may be customized to support the architecture of device 502, support an external bus I/O of device 502, or other interfaces of device 502.

Firmware security agent 516 may be configured to trap attempted access of resources in device 502 by intercepting particular read and write commands, which may make up part of a request of a resource. A read or write command may be intercepted, evaluated, and blocked or allowed based on a rule such as one in security rules 518. Security rules 518 for a firmware security agent 516 may include any suitable rules for detecting evidence of malware. Such a read and write command may be the result of, for example, a function call to a driver or an interrupt.

For example, security rules 518 may include rules for firmware security agent 516 to scan data to be written to the device. The content of the data, or a hash of the data, may be evaluated to determine whether the data corresponds to malware data or code. Such evaluations may be made by comparing the content against data or signatures in a whitelist or blacklist. Successive writes may have to be evaluated together to properly evaluate the full scope of the data or content to be written, in order to correctly identify the contents or data as malware or not. For example, a file may be written to in repeated successive calls to device 502. The data to be written may be queued such that a proper scan of the contents of the write command may be evaluated.

In another example, security rules 518 may include rules for firmware security agent 516 to scan existing data in the device. The device 502 may contain content received from outside the system such as in a network card. The contents of the received information, as it resides with the device 502, may be scanned for evidence of malware. Firmware security agent 516 may make evaluations by comparing the content against data or signatures in a whitelist or blacklist.

In yet another example, security rules 518 may include rules for firmware security agent 516 to evaluate a command based upon time or permissions. A device 502 such as a network device or disk may be protected from reads or writes during times when no legitimate activity should be conducted. For example, certain malware may attack disk drives during boot. Thus, firmware security agent 516 may prevent any writes to the device during the time that the disk is being booted. Similarly, permissions may be set by an administrator of the system in which device 502 resides about when or how devices or systems can be used. For example, an administrator of the system in which device 502 resides may set a device to be unusable outside of business hours. A network device on the system may have no legitimate purpose to transport activity outside of business hours, and thus based on the permissions in security rules 518, reads and writes of the network device may be blocked by firmware security agent 516. Such use may block, for example, deliberate activity by an actual user of the device, or by malware using the network device to conduct a denial-of-service attack.

In still yet another example, security rules 518 may include rules for firmware security agent 516 to evaluate a command based upon parameters used with the I/O commands. Such parameters may include, for example, the address to which a write command will write. Security rules 518 may include a rule indicating that a particular portion of a disk device is read-only. Thus, firmware security agent 516 may examine the parameters associated with an OUT command for writing data to the disk to determine the address to which the data will be written, and block the command if the attempted write is to a portion of disk that is write-protected by a rule in security rules 518. Firmware security agent 516 may consider such a parameter in conjunction with other bases such as content or the entity which originated the call. For example, scanning the content of data to be written may be expensive, and accordingly a security rule 518 may configure firmware security agent 516 to scan data to be written only if data is to be written to certain ranges of addresses. In another example, security rules such as security rule 518 may only allow certain calling entities to write or read from certain portions of the disk device. Thus, firmware security agent 516 may trap the attempted write or read and not allow the attempt until the identity of the calling entity may be securely determined. Such a determination may be made by evaluating information in the parameters used to call the device function, as some such functions may identify the calling device driver or application. In such a case, firmware security agent 516 may take any appropriate steps to determine the validity of the call. In one embodiment, firmware security agent 516 may consult a whitelist or blacklist in security rules 518 to determine whether the calling entity is authorized to make such a call. In another embodiment, firmware security agent 516 may communicate with other security agents in the system containing device 502 to determine whether the calling application or device driver is valid. Such other security agents may have validated the operation of the calling application or device driver, or may communicate with in-O/S security agents that may have verified such operations. In yet another example, the existing driver calls to a device such as device 502 may not identify the calling entity. Accordingly, no parameters may be available. In such an example, firmware security agent 516 may be configured to pass the triggered event or otherwise consult with other security agents in the system to determine the context of the call which resulted in the attempted access. Such other security agents may be able to provide suitable context for the call to determine whether an authorized entity made the attempt.

In a further example, security rules 518 may include rules for firmware security agent 516 to evaluate a command based on information from the environment in which device 502 resides. Other security agents in the system may have detected a malware infection that is difficult to remove, or may require direct intervention from an administrator to clean. The other security agents in the system may have observed suspicious behavior, and the nature of the behavior has not yet been completely analyzed. In such a case, firmware security agent 516 may receive notification of such an existing threat from the other security agents. Security rules 518 may thus dictate preventative actions for firmware security agent 516 depending upon the type of infection. For example, firmware security agent 516 in a keyboard device may receive notification that evidence of a particular type of malware known for keylogging has been detected but cannot yet be removed. Security rules 518 may thus dictate that firmware security agent 516 disallow all reads and writes from the keyboard device to prevent a compromise of the information being communicated with the keyboard.

Firmware security agents 516 may protect the I/O of different types of devices in different ways. For example, a firmware security agent 516 of a display device may shut down portions of the display, depending upon the malware threat. Firmware security agent 516 may block the display of certain patterns, causing a watermark to be produced on the screen. Firmware security agent 516 may trap the attempted display of a particular pattern. Firmware security agent 516 may intercept attempted reads of information from the device in order to prevent screen-captures.

In another example, a firmware security agent 516 for a keyboard device may optionally encode or decode its results in communication with the rest of the system. Such encryption may be set by the firmware security agent 516 upon notification that a malware threat such as a keylogger is present.

In yet another example, a firmware security agent 516 for a network device may trap based upon source Internet Protocol ("IP") address, source port number, data to be sent or received, destination IP address, or destination port number. Once such an attempt to use the network device is trapped, firmware security agent 516 may scan the data payload of packets to be sent or received for evidence of malware. In one embodiment, such data payloads may be sent to another security agent or a protection server, wherein the contents may be scanned for evidence of malware. The contents of the data payload may be encrypted such that a packet sniffer may not successfully intercept the contents. Attempted operations on the network device may be trapped due to security risks associated with communicating with unsafe network destinations, wherein network communication with a malicious destination may compromise the security of the system in which device 502 resides. Attempted operations may be trapped due to the sensitive nature of particular sets of data, such as a banking website. In such a case, upon receipt of data from such a website, the data may be encrypted by firmware security agent 516 before being passed to another security agent or to the calling entity. Such encryption may prevent a packet sniffer or filter in the system of device 502 from successfully intercepting the information.

The specific I/O commands 510 to be trapped may depend on the specific device and the operations of that device. Thus, the maker of device 502 may decide how to configure the operation of a firmware security agent 516 for a particular device 502. The maker of device 502 may decide how much to expose the functionality of device 502 to other security agents. For example, device 502 may be configured to require validation with other security agents before handing off triggered events to such security agents.

In operation, one or more below-O/S security agents may be running in the firmware of system 400 or of the components of system 400. Firmware security agent 440 may be operating in display 424, firmware security agent 442 may be operating in storage 426, and PC firmware security agent 444 may be operating in main PC firmware 408. Below-O/S agent 450 and in-O/S agent 412 may be operating in system 400. Each security agent may communicate with one or more other security agents in system 400. Each such security agent may validate the instance of another security agent before accepting communication. Protection server 402 may communicate with one or more of the security agents after validating the security agent.

PC firmware security agent 444 or below-O/S agent may be designated as a main security agent. The main security agent may communicate with protection server 402 to determine security rules. The main security agent may store the security rules locally to the main security agent. The main security agent may distribute security rules to each of the security agents, wherein the security rules may be stored locally to the security agent. The security rules may be customized for the type, make, or model of the device to reduce the expense of a large set of security rules.

Upon receipt of security rules such as rules 434, a device such as display 424 may set flags in a control structure within the device firmware 430 corresponding to operations of the device that are to be trapped. Similar tasks may be performed by storage 426.

An application 410 or driver 411 may try to access a device such as display 424 or storage 426. Application or driver 411 may make such an attempt by calling the kernel of operating system 412, which in turn may call operating system device drivers, which in turn may send the request to the component 424, 426.

The request may arrive at a device such as storage 426. Firmware security agent 442 running on the device may filter such a request through monitoring data transmission engine 412 of the storage 426 with a control structure. The request may take the form of an I/O command 510 made available by the storage 426. If the request matches any flags that have been set by firmware security agent 442, the request may be trapped and a resulting event may be triggered. Firmware security agent 442 may consult security rules 436 to determine how to handle the triggered event.

In one embodiment, the triggered event may be handled by firmware security agent 442, and based upon the information available such as associated data, the command, contextual information, time, or environmental information, corrective action many be taken. Such corrective action may include allowing or denying the request, removing malicious code or data, or encrypting data to be transferred. Other corrective action may include sending information to be passed to protection server 402 concerning the trapped event. Firmware security agent 442 may inform other security agents about the status of the trapped event, so that other such agents may also take corrective action after consulting their respective security rules. For example, if firmware security agent 442 detects a malware attack of unknown origin, firmware security agent 440 may lock out additional access to the display 424.

In another embodiment, the triggered event may be transferred to another security agent for handling, such as in-O/S security agent 418, PC firmware security agent 444, or below-O/S agent 450. The receiving security agent, for example, PC firmware security agent, 444, may handle the triggered event by consulting security rules 438. Based upon the information available such as the data, command, contextual information, time, or environmental information, the request represented by the triggered event may be allowed or denied by PC firmware security agent 444. PC firmware security agent 444 may communicate with in-O/S security agent 418 to determine contextual information concerning the attempted access of resources. PC firmware security agent 444 may communicate with protection server 402 for additional information on how to handle the triggered event. PC firmware security agent 444 may send instructions for resulting action back to the originating firmware security agent 442. PC firmware security agent 444 may send information concerning the triggered event to protection server 402 to be analyzed or recorded. Such analysis or recording may be conducted when the malicious nature of a triggered event is unknown. PC firmware security agent 444 may notify the security agents of system 400 that a particular kind of malware has been detected, a kind of suspicious activity has been detected, or that the system 400 is under a malware attack.

Upon receipt of information from PC firmware security agent 444, firmware security agent 440 may take corrective action. Such action may include allowing or denying the attempted access, encrypting data to be transferred, or removing malicious code or data.

Figure 6:
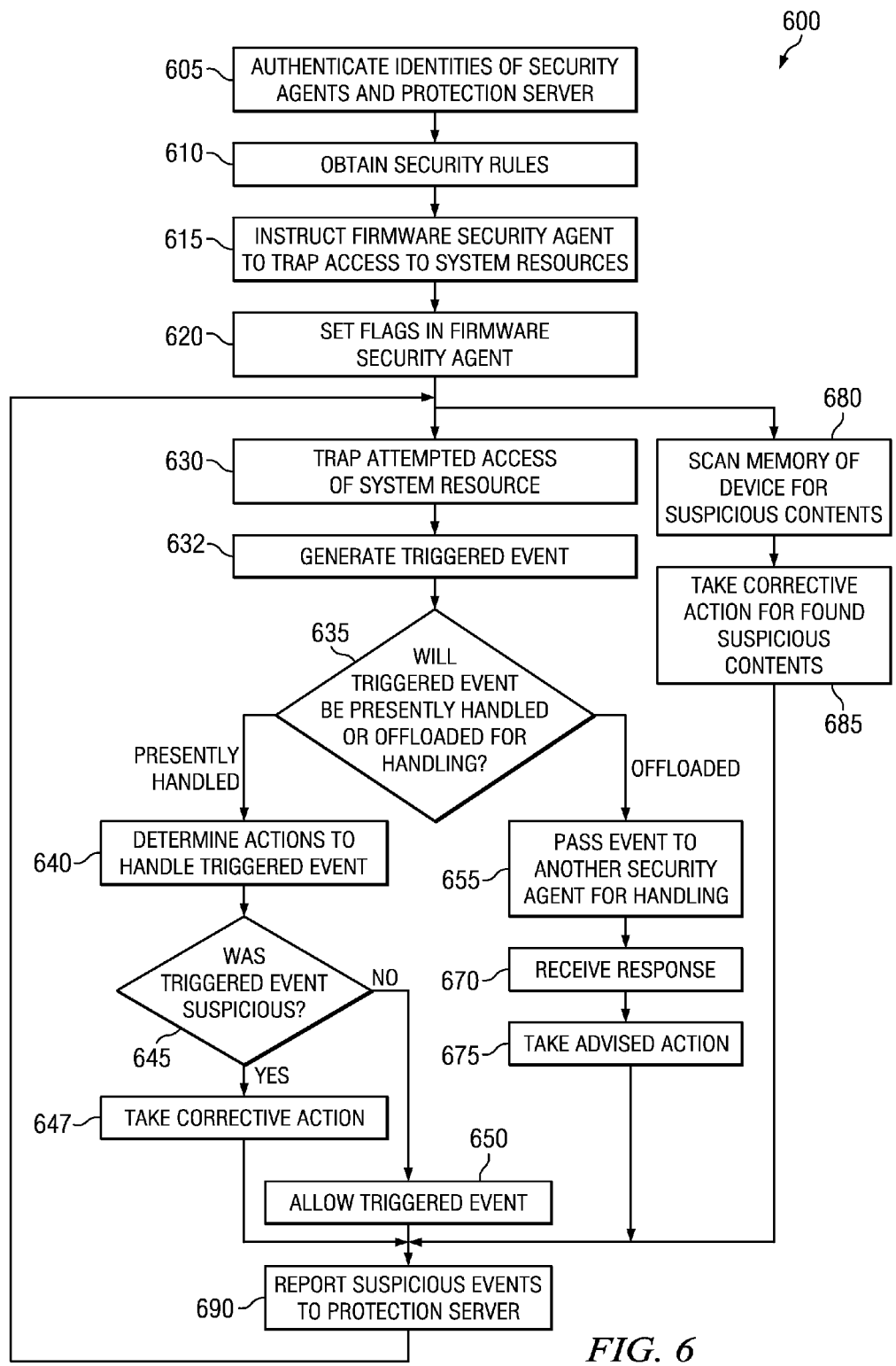
FIG. 6 is an example embodiment of a method for firmware-based protection for an electronic device from malware.

FIG. 6 is an example embodiment of a method 600 for firmware-based configurable protection for an electronic device from malware. In step 605, the identity and security of a below-O/S security agent, in-O/S security agent, protection server, and firmware security agent may be authenticated. Such authentication may be done through any suitable method, including by locating and verifying the images of each located in memory, cryptographic hashing, or secret keys. Until step 605 is completed, operation of other steps may be withheld.

In step 610, a protection server may be accessed to determine security rules. Such security rules may be used to make decisions in the following steps. In step 615, the firmware security agent may be instructed to trap access to system resources. Such access may arise from applications, drivers, or operating systems running on the electronic device. The firmware security agent may be instructed as to what system resources of the electronic device are to be monitored. The firmware security agent may also be instructed as to what operations on the monitored system resources are to be trapped. For example, read and write commands to a device on which the firmware security agent is running may be identified to be trapped. In step 620, flags corresponding to such operations to be trapped may be set in a control structure. Such trapped operations may generate a triggered event.

The electronic device may operate and be protected by one or more of the trapping of access of system resources in steps 630-675, or scanning data for the presence of malware in steps 680-685. Each of trapping the access of system resources and scanning data for the presence of malware may be conducted in parallel. Further, each of these may be repeated as necessary to protect the operation of the electronic device.

In step 630, the access of a system resource such as system memory, registers, or I/O devices may be trapped. Such trapping may be conducted below the level of operating systems running on the electronic device. Such trapping may be conducted within firmware. In step 632, a resulting triggered event may be generated associated with the trapped attempt, as well as any associated information. In step 635, it may be determined whether the triggered event should be presently handled or passed to another security agent for handling. Such a determination may be made by accessing one or more security rules. If the triggered event should be presently handled, then in step 640 the security rules may be accessed to determine what actions to take based on the trapped event and other information, such as associated data, the command, contextual information, time, or environmental information. For example, the data to be written or read may be scanned for sensitive or malicious content; the calling entity may be identified to see if the entity has permission; the parameters used to call the command may be examined; or alerts about malware in the system from other security agents may be referenced.

In step 642 it may be determined whether the attempted access was suspicious or not. If accessing the security rules in combination with information associated with the attempted access yields a determination that the attempted access is not suspicious, then in step 645 the attempt may be allowed. If it is determined that such an attempt is suspicious, then in step 647 corrective action may be taken. Such corrective action may include removing malicious content from data, informing a protection server or other security agents about the presence of a malicious attempt, disallowing the attempted access, or encrypting data to be transferred. If the attempt is not suspicious, then in step 650 the triggered event may be allowed.

In step 655, if it is determined that another security agent is to handle the triggered event, the triggered event is passed to another security agent for handling. In step 670, a response from the security agent may be received indicating appropriate action to be taken. In step 675, such action may be taken, such as corrective action or allowing the operation of the triggered event.

In step 680, memory of a device may be scanned for the presence of malware. Such memory may contain contents that have arrived from another entity, such as another network card or the results of a previously executed file read. If the contents of the memory are known to be malicious, suspicious, or unknown, then in step 685, the contents of the memory may be removed.

In step 690, if an attempted access was denied, or if suspicious contents were found, then such an event may be reported to another security agent or a protection server. Such a report may include information regarding any associated malware or suspicious behavior.

The steps of method 600 may be repeated as necessary to protect the electronic device continuously, periodically, or upon demand.

Figure 7:
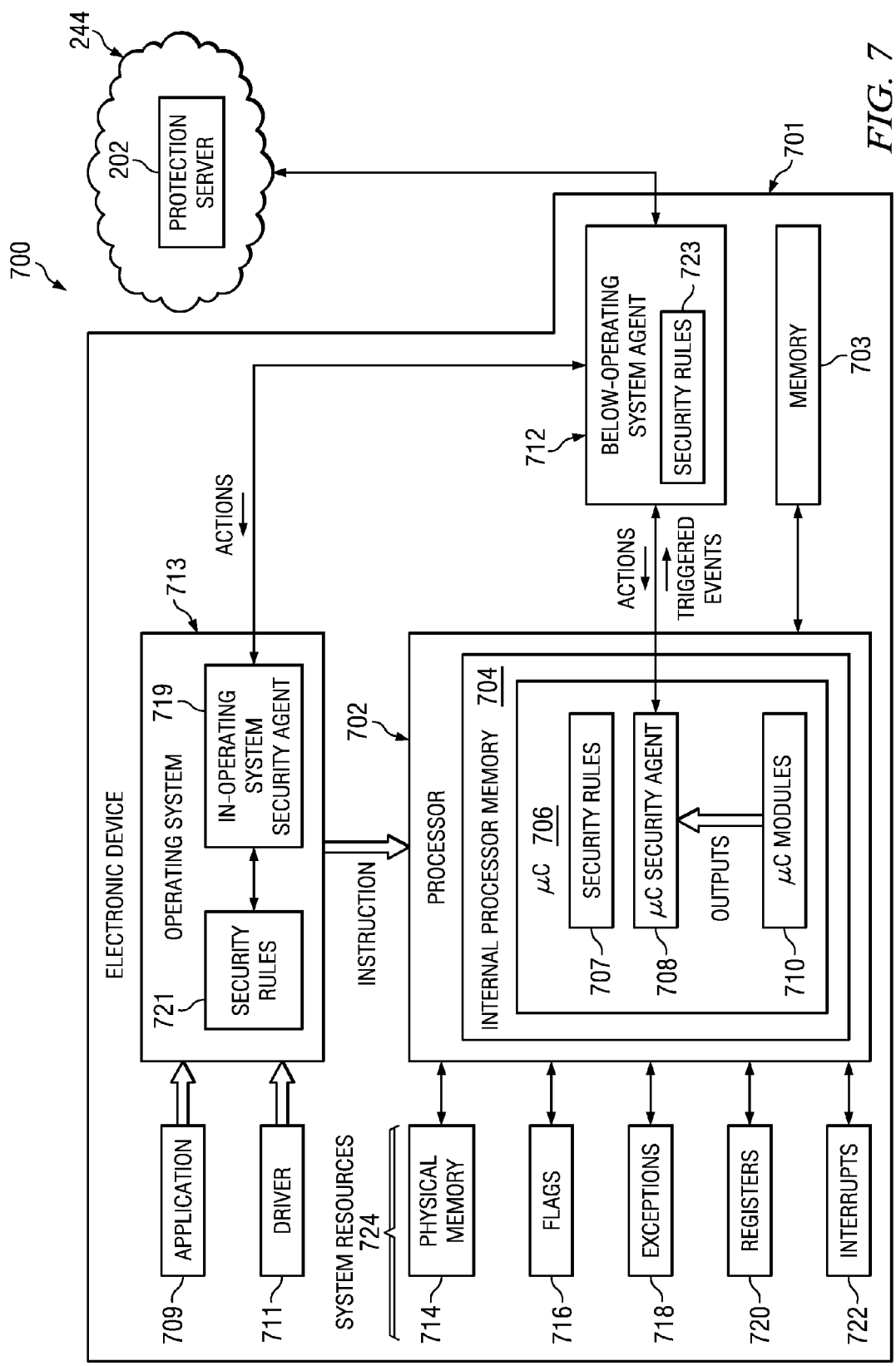
FIG. 7 is an example embodiment of a microcode-based system for protection of an electronic device against malware.

FIG. 7 is an example embodiment of a microcode-based system 700 for protection of an electronic device 204 against malware. System 700 may be an example embodiment of system 100, implementing certain elements of system 100 in a microcode. The trapping operations of system 700 may be conducted below the operating systems of electronic device 701. System 700 may include one or more below-O/S security agents configured to trap attempted use of access to the resources of the electronic device 204, generate a triggered event corresponding to the attempt, consult security rules regarding the triggered event, and take corrective action if necessary regarding the attempt. Such below-O/S security agents may be configured to intercept information generated from resources of the electronic device 701, generate a triggered event corresponding to the generation, consult security rules regarding the triggered event, and take corrective action if necessary regarding the attempt. One or more of such below-O/S security agents may be implemented fully or in part in a processor of system 700. The below-O/S security agents may be implemented fully or in part in microcode ("μC") of such a processor. The system resources 724 of electronic device 701 that may be protected by system 700 may include, for example, resources similar to the system resources 224 of FIG. 2, physical memory 714, processor flags 716, exceptions 718, registers 720, or interrupts 722.

System 700 may include a microcode-based below-O/S security agent such as microcode security agent 708. Microcode security agent 708 may reside within the microcode 708 of a processor such as processor 704. In one embodiment, microcode security agent 708 may be configured to trap attempted access of system resources 724 made by portions of system 700 such as application 710, driver 711, or operating system 713. Microcode security agent 708 may be configured to create a triggered event based on such an attempted access of system resources 724. For example, operating system 713 may attempt to launch a program by attempting to execute a segment of code in an address in physical memory 714. In another example, operating system 713 may attempt to read or write an address in physical memory 714. Although physical memory 714 is shown, microcode security agent may be configured to trap an attempt to access virtual memory. In another embodiment, microcode security agent 708 may be configured to trap attempted communication of information from other portions of processor 702, such as microcode modules 710. Microcode modules 710 may include other portions of processor 702 configured to conduct the operation of processor 702 to execute instructions. Such attempted communication of information may include the results of operations from system resources 724. For example, during the processing of code, and divide-by-zero operation may be intercepted by a microcode module 710 and may attempt to generate and communicate an exception 718.

Microcode 706 may include hardware-level instructions for carrying out higher-level instructions received from elements of system 700 such as operating system 713. Microcode 706 may translate such higher-level instructions into circuit-level instructions to be executed by processor 702. Microcode 706 may be specific to the electronic circuitry or type of processor embodied by processor 702. Microcode 706 may be configured with the specific contents of microcode 706 upon the creation of processor 702. The ability to update or reprogram microcode 706 on processor 702 may be limited. Microcode 706 may reside in an internal processor memory 704. Internal processor memory 704 may be a high-speed memory separate from the system memory of system 700, such as memory 703. In one embodiment, internal processor memory 704 may be read-only-memory. In another embodiment, microcode 706 may reside in a programmable logic array included in internal processor memory 704. In yet another embodiment, internal processor memory 704 may include or be implemented as a memory store or a control store. In such an embodiment, internal processor memory 704 may be implemented partially or in full by static-random-access-memory or flash memory. In such an embodiment, microcode 706 may be configured to be loaded into the memory store from some other storage medium, such as memory 703, as part of the initialization of the processor 702, and may be configured to be updated, reinstalled, or receive new information such as security rules or machine instructions through data written to the memory store.

Microcode security agent 708 may be configured to access security rules 707 to determine what operations, commands, communications, or other actions to trap. Security rules 707 may reside within microcode 706, or another suitable portion of processor 702 or system 700. Security rules 707 may be implemented by functional calls from entities outside processor 702, such as other security agents making calls to microcode security agent 708 and passing information through parameters. Microcode security agent 708 may be communicatively coupled to security rules 707. In one example, a security rule 707 may have logic such as:

If address (x) is executed by code in virtual memory range (X1-->X2) or physical memory range (Y1-->Y2), then generate a triggered event to below-O/S agent for handling;
If address (x) is executed by code in physical memory range (Z1-->Z2), then skip instruction;
If A, B, and C; then memory range (Y1-->Y2) may access memory range (X1-->X2); and
Only code from memory ranges (Y1->Y2) and (T1->T2) may write to (Z1-->Z2).

Microcode 706 may include a state machine to understand the context of instructions that have been received. Such information may be needed to carry out certain security rules 707 which, for example, evaluate successive operations within the context of each other. Such information may be passed with a triggered event.

One or more of the below-O/S security agents of system 700 may also be embodied in below-O/S agent 712. Below-O/S agent 712 may be implemented in any suitable manner for providing triggering of access of resources, or handling of such triggers, below the level of operating systems of electronic device 701 such as operating system 713. Below-O/S agent 712 may embody some or all of the functionality of SVMM 216 or SVMM security agent 217 of FIG. 2; firmware security agent 440, 442 or PC firmware security agent 444 of FIG. 4; or firmware security agent 516 of FIG. 5. Below-O/S agent 712 may be communicatively coupled to security rules 723.

In one embodiment, one or more of the below-O/S security agents of system 700 such as below-O/S agent 712 may be configured to handle triggered events generated by microcode-based security agents such as microcode security agent 708. Below-O/S agent 712 may be configured to also trap access to resources or handle triggered events in a similar fashion as below-O/S agents in FIGS. 1-2 and 4-5. Below-O/S agent 712 and microcode security agent 708 may be communicatively coupled. Microcode security agent 708 may be configured to send triggered events to below-O/S agent 712. Below-O/S agent 712 may be communicatively coupled to other security agents such as in-O/S security agent 719, and may be communicatively coupled to protection server 202. Below-O/S agent 712 may be configured to receive contextual information from other security agents such as in-O/S security agent 719. Such information may provide information about the entity which generated an attempted access to system resources 724. If more than one in-O/S security agent 719 is present in system 700, each in-O/S security agent 719 may be configured to perform a designated portion of the trapping, validating, or other tasks associated with in-O/S security agent 719. Such portions may be defined by below-operating-system security agents. For example, one in-O/S security agent 719 may validate or investigate MOV instructions, while another in-O/S security agent 719 may validate or investigate JMP instructions.

Below-O/S agent 712 may also be configured to receive security rules or just-in-time information from protection server 202. Furthermore, below-O/S agent 712 may be configured to consult security rules such as security rules 723, any received contextual information from other security agents such as in-O/S security agent 719, or protection server 202 in order to determine how to handle a received triggered event from microcode security agent 708.

In particular embodiments, below-O/S agent 712 may contain a behavioral state machine, to understand the context of operations encountered in system 700. Below-O/S agent 712 may then be configured to determine an appropriate action to be executed by microcode security agent 708 based upon the context. Such action may include a corrective action, allowing an operation, denying an operation, or taking other steps in furtherance of the requirements of a security rule. Microcode security agent 708 may be configured to take such actions as received from below-O/S agent 712.

Below-O/S agent 712 may be also be configured to determine an appropriate action to be executed by another security agent, such as in-O/S security agent 719. For example, if a triggered event from microcode security agent 708 indicates a particular kind of malware threat, or a threat to a particular portion of the kernel or user mode of electronic device 701, below-O/S agent 712 may be configured to instruct in-O/S security agent 719 to take a corrective action. Thus, below-O/S agent 712 may control in-O/S security agent 719.

Below-O/S agent 712 may be configured to validate the instance of microcode security agent 708, and vice-versa. Below-O/S agent 712 may be configured to communicate with microcode security agent 708 to share or set security rules such as those from security rules 723 to be implemented in security rules 707, status information regarding system 700, administrator or environmental settings and preferences, or other suitable information for microcode security agent 708 to trap operations, generate triggers, and handle such triggers or send them to other security agents.

Below-O/S agent 712 may be configured to communicate such information to microcode security agent 708 through any suitable mechanism. Below-O/S agent 712 may call functions of the processor 702, microcode 706, or microcode security agent 708, and pass information as parameters to the functions. Such functions may be created specifically to pass such changes to microcode security agent 708. For example, to ban the access of a range of physical memory "A" from any entity operating from the memory from another range of physical memory "B," a function such as "Bar_Memory(A, B)" could be used. Microcode security agent 708, as a result of this function being called, may be configured to set parameters within microcode 706. Calling such microcode instructions may be privileged, such that microcode security agent 708 may be configured to validate below-O/S agent 712 before calling such microcode instructions on behalf of below-O/S agent 712. In another example, below-O/S agent 712 or microcode security agent 708 may communicate such information by writing data to a memory store, control store, or other writeable portions of processor 702 or microcode 706.

Processor 702 may have limited resources for microcode security agent 708 to fully implement all necessary trapping and handling to protect system 700 from malware. In one embodiment, microcode security agent 708 may be configured to implement only trapping of actions to be conducted by processor 702, and may offload triggers associated with such trapping to other security agents or components of system 700 for subsequent handling. Microcode security agent 708 may take subsequent action, such as allowing or disallowing a request or communication, or may take other action such as reporting information. In another embodiment, microcode security agent 708 may be configured to implement handling of a small portion of triggered events. Suitable triggered events for such handling may include those not requiring significant contextual information. For example microcode security agent 708 may receive information through security rules 707 that a particular range of memory addresses is to be protected from all reads and writes, unless an instance of below-O/S agent 712 has been validated. Such a security rule may be implemented because the contents are quite sensitive, and without the operational assistance of below-O/S agent 712, the identity of the entity accessing the memory contents cannot be identified. Thus, after validating the instance and operation of below-O/S agent, microcode security agent 708 may set a bit indicating such validation. If an attempted access of the memory is triggered, and the bit has not yet been set, then microcode security agent 708 may be configured to disallow the reading, writing, or execution of the contents of the memory range. If the bit has been set, then microcode security agent 708 may be configured to then trap the attempted access to the memory range, generate a triggered event to be sent to below-O/S agent 712, which would evaluate from contextual information and other settings whether the calling entity was allowed to access the memory range. Below-O/S agent 712 may then send a resulting action back to microcode security agent 708, perhaps indicating whether to allow or deny the access.

A triggered event may include any suitable information that may be used for identification of the source, method, or destination of the attempted action. The triggered event may be used by microcode security agent 708 or below-O/S security agent 712 to apply security rules. The triggered event may be generated by microcode security agent 708. For example, the triggered event may detail precisely what resource was accessed, what instruction was called, what instruction operands were used, from what memory address the attempt or instruction came from (i.e. the source memory), into what memory the operation's result was to be stored in (i.e. the target memory) or what memory will be affected, or any other information leading to identification of the source, method, or destination of the attempted action. Microcode security agent 708 may also be configured to include information regarding processor 702 such as processor states of active, sleep, idle, halt, and reset; interprocessor communications; and power consumption.

Another security agent such as below-O/S agent 712 may be configured to use such information in a triggered event to determine the scope of the event when applying a security rule 722. Below-O/S agent 712 may have access to additional clues such as information about the entities operating in operating system 713, new information in protection server 202, malware or other threats detected by other security agents, administrator settings, etc. For example, given a trapped request originating from a particular address in physical memory, below-O/S agent 712 may be able to determine the thread, process or application associated with the particular address. Then, below-O/S agent 712 may be configured to determine whether such an entity is authorized to take the action in question. Below-O/S agent 712 may be configured to determine the identity of the entity. Below-O/S agent 712 may be configured to classify the entity as known to be safe (e.g., by consulting a whitelist), known to be malicious (e.g., by observing behavior or consulting a blacklist of known malware), or unknown. Below-O/S agent 712 may be configured to report information about unknown and malicious entities to protection server 202.

Microcode security agent 708 may have access—for trapping purposes—to certain processor 702 resources and other system resources 724 that may be unavailable to other security agents. In one embodiment, implementation of microcode security agent 708 within the microcode 706 may avoid limitations created by limited exposure of such resources to calling entities outside of the processor. For example, a virtual machine monitor may be limited to trapping operations on resources which have been exposed by processor 702 for virtualization purposes. Take as a further example the ability to trap an attempted read, write, or execute upon memory. A virtual-machine-monitor-based security agent may only have access to memory as it is available to be virtualized, and, as a consequence, may only be able to trace attempted read, write, or execution attempts to a memory page. In contrast, microcode security agent 708 may be able to intercept and handle a read, write, or execute request to a specific physical memory address, and evaluate the request based upon security rules 707. The smaller granularity may provide greater flexibility in providing security solutions in system 700. The instruction-level awareness of what instruction was used in context with a specific physical memory address informs system 700 of which entity called what resource, and not merely that a memory page was accessed. This flexibility may be very valuable. For example, microcode security agent 708 may monitor two adjacent memory addresses for read, write, or execute attempts, but may be directed by security rules 707 to take completely different actions based upon which of the two memory addresses were accessed. With a view only into the memory page on which an attempt is made, such a distinction in rules may fail to be applied. In another example, other methods by hypervisors for monitoring and setting debug registers did not have the context of the instructions which were used to access the debug registers, as does system 700. In addition, some other entities for setting or watching such debug registers do not run below the level of the operating system, making them more prone to malware. Finally, some other entities for setting or watching such debug registers are not directed towards security, and are not capable of accessing security rules, evaluating the access, and taking a corrective action.

Corrective actions to be taken by microcode security agent 708 may include any suitable action determined by security rules 707 or received from below-O/S agent 712. Commands or instructions may be allowed or denied. Information generated from microcode modules 710 may be allowed or suppressed. Any such commands, instruction, or information may be modified.

Microcode security agent 708 may be configured to trap the generation of interrupts. The interrupts may be trapped by trapping, for example, an execution of an "INT" instruction, followed by reading relevant registers known to host information associated with an interrupt. For example, general purpose registers may be read to learn the code identifier of the interrupt, as well as the parameters used to call it. For example, interrupt 13 may be a disk interrupt, and a known set of registers may identify the interrupt as a read or write, as well as relevant sectors and locations of data.

Microcode security agent 708 may be configured to trap values being written to input and output ports of processor 702. Microcode security agent 708 may be configured to trap values being written to input and output devices by processor 702. Microcode security agent 708 may be configured to trap on instructions for making such writes or reads.

Microcode security agent 708 may also be configured to trap certain operations of an arithmetic logic unit ("ALU") of processor 702. A series of operations on the processor corresponding to the steps of a protected hashing algorithm may be trapped to determine unauthorized access of the function. Some arithmetic operations are used by malware to disguise or morph themselves. Certain arithmetic instructions, bitwise instructions, or MOV instructions are all instructions that might cause a change in the content of a memory page or address range. By trapping such instructions, changes to a code section or data section may be recorded. If subsequent analysis shows that the code section or data section was modified as part of self-modifying malware, then the trapped and recorded instructions may be used to track the encryption algorithm used by the malware. For example, it may be determined that the malware uses an XOR function with a particular key to morph itself. Such information may yield better security rules for detecting self-modifying malware. Further, by keeping track of memory modifications, repair logic may be achieved by reversing the application of the instructions.

In addition, microcode security agent 708 may be configured to conduct digital-rights-management operations. For example, microcode security agent 708 may be configured to receive a security rule 707 indicating that authorization to run a particular program is required. The particular program may be located at a specific address in memory. Such an authorization may take the form of the microcode security agent 708 receiving, for example, an authorization code, key, or byte from below-O/S security agent 712. Such an authorization may be accomplished by microcode security agent 708 trapping attempted access on the memory or loading of the programs instructions, and sending the triggered event to below-O/S security agent 712, which in turn may have access to the authorization code, key, or byte. The below-O/S security agent 712 may return the decision to the microcode security gent 712. Thus, operation of the program may be allowed or disallowed based on the authorization code.

Furthermore, microcode security agent 708 may be configured to stop the execution of specific code in memory based upon a hash or a checksum of the memory. Such a hash or checksum may be indicated by a security rule 707 as malicious. As the code is loaded from memory, microcode security agent 708 may conduct the hash or checksum of the contents, compare it with those of known malicious code, and then deny the attempt to load and load a repair function to eliminate the offending code.

Below-O/S agent 712 may be configured to inform other security agents of system 700, including microcode security agent 706 that it has been determined that system 700 has been infected with malware, encountered suspicious behavior, or otherwise been compromised. In such a case, microcode security agent 706 may be configured to disable operation of portions of processor 702. Microcode security agent 706 may be configured to disable such operations by trapping and denying requests to specific system resources 724, or generated communication from microcode modules 710. Portions of processor 702 may be disabled because they are sensitive, or likely to be misused by malware.

Microcode security agent 706 may be configured to protect a memory address or a range of memory addresses from attempts to load, read, write, or execute attempts. Such memory may include sensitive data, or may be the initialization point for a restricted, sensitive, or protected function. Microcode security agent 706 may prevent access to such memory where there is no verification that the accessing software is safe or neutral. In such a case, security agents such as below-O/S agent 712 may identify specific memory addresses to be protected, perhaps because such memory addresses may correspond to the example sensitive information or protected routines. Below-O/S agent 712 may send microcode security agent 708 information such as security rules 707 regarding which addresses to protect. Microcode security agent 708 may trap attempted loading, executing, reading or writing to such memory addresses and send a corresponding triggered event to below-O/S agent 712. Below-O/S agent 712 may determine whether the calling software is safe or neutral according to security rules 723, information from protection server 202, a whitelist, or any other suitable information source. Below-O/S agent 712 may return an action to be implemented back to microcode security agent 708. Microcode security agent 706 may be configured to protect a page or range in virtual memory and/or an address or range in physical memory. Microcode security agent 706 may be configured to translate virtual memory pages, locations, or addresses into physical memory locations or addresses. Thus, given a virtual memory location to trap, or a virtual memory location from where an attempt originated, microcode security agent 706 may be configured to determine the corresponding physical memory locations, or vice-versa.

Furthermore, microcode security agent 708 may be configured to protect the access of sensitive code. In one embodiment, microcode security agent 708 may be configured to protect the access of sensitive code in the manner described above by monitoring access of a particular address, wherein the address represents the beginning of the code as it is stored in memory. In another embodiment, microcode security agent 708 may be configured to monitor the execution of "JMP" or similar branching instructions which would move the operation of processor 304 into the middle of sensitive data or code. In such a case, microcode security agent 708 may be configured to trap the execution of "JMP" instructions in combination with the sensitive memory ranges. Microcode security agent 708 may be configured to analyze from where the "JMP" instruction originated. The microcode security agent 708 may be configured to generate a triggered event corresponding to the trapped "JMP" attempted execution, which may be handled by below-O/S agent 712. The below-O/S agent 712 may be configured to take into account where the "JMP" instruction originated, and whether such memory where the "JMP" instruction originated is authorized to access the memory in question.

Microcode security agent 708 itself, or the trapping functionality therein may also be configured to be enabled or disabled by other portions of system 700. Such capabilities may be useful if trapping and handling events are expensive, thus possibly harming system performance. Such enabling and disabling may be based upon the use of particularly sensitive programs or data, detection of a malware threat, administration preferences, or any other suitable reason. In one embodiment, microcode security agent 706 may be configured to receive a MSAOn signal, VMXOn signal, or other instruction from below-O/S agent 712 to begin security processing and trapping. Microcode security agent 708 may receive an MSAOff signal, "VMWrite VMXOff" signal, or other instruction to stop security processing and trapping. Before beginning or stopping security processing and trapping, microcode security agent 708 may validate the identity and instance of the security agent making the request.

Furthermore, microcode security agent 708 may be configured to intercept interprocessor messages and commands between processor 702 and other processors of electronic device 701. Such interprocessor commands may be received by an appropriate microcode module 710 or be attempted by an entity of electronic device 701 accessing particular system resources 724. In one embodiment, interprocessor commands may be sent from software accessing processor 702 from operating system 713 by way of a machine state register. Malware may try to send such messages, for example, to turn off processors or put them in sleep mode. Microcode security agent 708 may be configured to trap the attempted writes to, for example, the MSR register that correspond to interprocessor commands. A triggered event for the trapped command may be sent to below-O/S agent 712 for handling to verify the source of the attempt.

Microcode security agent 708 may be configured to intercept the generation and communication of messages from the processor such as software interrupts 722. Microcode security agent 708 may be configured to control the execution of an interrupt such that they may be accessed by authorized software only. For example, drivers without a known identity (such as determined by hashes, source of driver in memory, etc.) or a malicious identity will not be allowed to execute software interrupts. Microcode security agent 708 may trap the access of the interrupt and pass the triggered event to the below-O/S agent 712 for handling.

In another example, microcode security agent 708 may be configured to trap the generation of exceptions 718 by processor 702. Exceptions may include, for example, divide-by-zero operations, page faults, and debug signals. Read access to the memory addresses containing these may be trapped by microcode security agent 708 and handled by below-O/S agent 712.

Microcode security agent 708 may be configured to protect various data structures of the processor 702. For example, malware may attack the Interrupt Descriptor Table ("IDT"). In one embodiment, microcode security agent 708 may trap write access attempts to memory locations containing the IDT itself. In another embodiment, microcode security agent 708 may protect the memory locations where functions for changing the IDT are stored, such as "LOAD IDT" and "STORE IDT." In another example, microcode security agent 708 may be configured to protect the EFLABS or similar data structure, or flags associated with interrupt handlers. Malware may attempt to subvert the operation of interrupt handlers through the alteration of such resources by unauthorized sources.

Although microcode security agent 708 may be specific to the particular instances of a specific type of processor, as different circuitry arrangements may necessitate different microcode instructions, a set of security rules 707 may be valid for all processors using a given instruction set. This may be possible because microcode security agent 708 may trap certain instructions, which would not change between different processors implementing the same instruction set, but the circuitry where the associated resources may vary and depend upon the circuitry. For example, a main desktop central processing unit ("CPU") and an embedded system CPU may both be ISA processors from the same manufacturer, and thus security rules 707 may be shared at least in part between the two types of processors. In contrast, a graphics processing unit on a graphics processor or an automobile embedded processor with a different instruction set may not be able to share security rules 707.

In operation, microcode security agent 708 may be running in the processor 702 of electronic device 701 and below-O/S agent 712 may be running below the level of operating system of electronic device 104. Microcode security agent 708 and below-O/S agent 712 may authenticate each other. Microcode security agent 708 may initiate trapping of access to system resources 724 and outputs or communication generated by microcode modules 710. Microcode security agent 708 may be so initiated upon demand from below-O/S agent 712, upon a security rule 707, or upon startup of processor 702. Below-O/S agent 712 may send a security enablement request to microcode security agent 708 because of an occurrence in system 700, an administrator or system setting, or because of a triggered security rules 723. Such a request may be generated, for example, because a particular program is to be executed, sensitive data is to be accessed, or a malware threat has been detected elsewhere in system 700. In-O/S security agent 719 and/or below-O/S system agent 712 may authenticate itself to microcode security agent 708. To authenticate itself, in-O/S security agent 719 and/or below-O/S system agent may call a privileged instruction provided by processor 702 to initiate the authentication process. The call may cause microcode security agent 708 measure and authenticate, with a signature or hash, for example, in-O/S security agent 719 and/or below-O/S system agent 712.

Microcode security agent 708 may receive security rules 707 from below-O/S agent 712. Microcode security agent 708 may be updated by function calls, or by writes to shared memory such as a memory store. Microcode security agent 708 may apply flags based on security rules 707 to a control structure of microcode 706 configured to trap specific instructions, operands to such instructions, target addresses, source addresses, or any combination thereof. Microcode security agent 708 may trap attempted accesses of system resources by entities running above the processor, such as operating system 713, application 710, or driver 711. The operation of microcode security agent 708 may be transparent to such entities. Microcode security agent 708 may trap the generation of information such as outputs from instances of other microcode modules 710. Such microcode modules 710 may include other portions of microcode configured to perform various tasks for processor 702. For example, some of microcode modules 710 may detect when a processor exception or interrupt is to be generated, how to route input and output data, or perform mathematical operations. The operation of microcode security agent 708 may be transparent to such modules. Microcode security agent 708 may use a state machine to perform certain trapping predicated on previous events observed.

Upon trapping an access to a resource or a generation of information, microcode security agent 708 may created a triggered event associated with the trapping. Such a triggered event may contain information about the trapping, including contextual information such as the instruction trapped, parameters used, originating memory locations, and target memory locations.

In one embodiment, microcode security agent 708 may handle the triggered event. In another embodiment, microcode security agent 708 may pass the triggered event to below-O/S agent 712 or another security agent for handling. Microcode security agent 708 may consult security rules 707 to determine whether and how to handle the triggered event, or to pass the triggered event to below-O/S agent 712. Microcode security agent 708 may wait for a reply from below-O/S agent 712, or may allow the trapped action if no follow-up is required by security rules 707. Microcode security agent 708 may take corrective action based on security rules 707, such as allowing or denying an instruction, or replacing a value or parameter to be executed.

Below-O/S agent 712 may receive a triggered event from microcode security agent 708. Below-O/S agent 712 may consult security rules such as security rules 723 to determine an appropriate action to take based on the triggered event. Below-O/S agent 712 may use triggered event information from microcode security agent 708, contextual information from in-O/S security agent 719, information from protection server 202, determinations from other security agents, administrator settings, time, or other information to determine the appropriate action that should be taken. Below-O/S agent 712 may send actions to be taken to in-O/S security agent 719 and/or microcode security agent 708. Below-O/S agent 712 may send information regarding the triggered event and resultant actions to protection server 202.

Microcode security agent 708 may receive an action to be taken from another security agent, such as below-O/S agent 712. Microcode security agent 708 may execute the received action, such as allowing or denying an instruction, or replacing a value or parameter to be executed.

Figure 8:
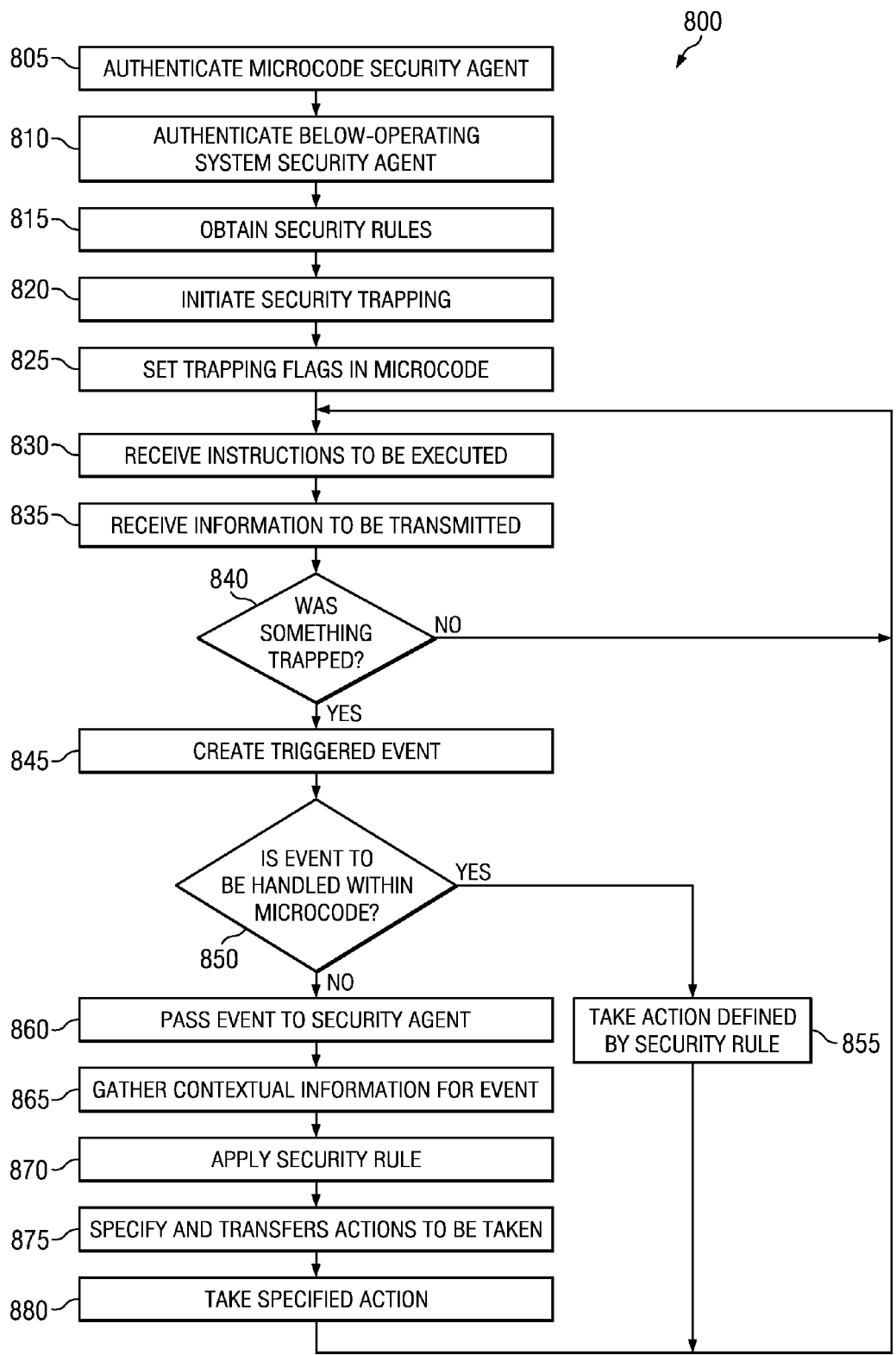
FIG. 8 is an example embodiment of a method for microcode-based protection for an electronic device from malware.

FIG. 8 is an example embodiment of a method 800 for microcode-based, personalized and configurable protection for an electronic device from malware. In step 805, an instance of a microcode security agent may be validated. In step 810, an instance of another security agent may be validated. Such a security agent may include a below-O/S security agent. In step 815, one or more security rules for trapping at microcode level within a processor may be obtained, sent or received. Such security rules may be communicated by, for example, function calls or by writing parameters to a shared memory space. In step 820, security trapping of resources at the microcode level may be initiated. In one embodiment, such initiation may arise from receiving a signal to begin security trapping. In such an embodiment, a signal may be received because a malicious attack on a system has been detected, or because sensitive data may be present in a system. In another embodiment, such initiation may arise from consultation of a security rule. In yet another embodiment, such initiation may arise from the startup of a processor.

In step 825, flags corresponding to operations to be trapped may be set in microcode. Such flags may correspond to specific instructions, operands to such instructions, target addresses, source addresses, or any combination thereof. Such flags may be defined by security rules that were received. In step 830, instructions to be executed may be received and compared against the trapping flags. In step 835, information generated and to be sent from microcode may be received and compared against the trapping flags. Steps 830 and 835 may be implemented by way of a state machine, wherein the steps may be repeated, and the results from multiple iterations of step may be remembered and compared together against a flag or security rule.

In step 840, it may be determined whether an instruction or information has been trapped. If nothing was trapped, the method may return to monitoring instructions and generated information in steps 830 and 835. If something was trapped, then in step 845 a triggered event associated with the trapping may be created. Such a triggered event may contain information about the trapping, including contextual information such as the instruction trapped, parameters used, originating memory locations, and target memory locations.

In step 850, it may be determined whether the triggered event is to be handled within microcode, or whether a security agent outside microcode should handle the triggered event. If the triggered event is to be handled within microcode, then in step 855 an appropriate action for the triggered event may be taken. Such an action may be defined by consulting a security rule. Such an action may include allowing an instruction to be executed or information to be sent, denying the instruction or communication, replacing values in memory or in parameters, or any other corrective action required. The method 800 may then continue security monitoring in steps 830 and 835.

If the triggered event is to be handled outside of the microcode, then in step 860 the triggered event may be sent to a security agent for handling the triggered event. In step 865, additional information related to the triggered event may be gathered. Such information may include settings, preferences, contextual information, or malware status. Such information may be used in step 870 to apply a security rule to the triggered event. Such an application may yield a course of action to be taken with respect to the triggered event. In step 875 such a course of action may be specified and transferred to various security agents which may implement the specified action. Such actions may include corrective actions, allowing an operation or communication to take place, reporting the event to a protection sever, or any other suitable result. In step 880, the actions specified in step 875 may be taken. The method 800 may then continue security monitoring in steps 830 and 835.

Although FIGS. 3, 6 and 8 disclose a particular number of steps to be taken with respect to example methods 300, 600, and 800, methods 300, 600, and 800 may be executed with more or fewer steps than those depicted in FIGS. 3, 6 and 8. In addition, although FIGS. 3, 6 and 8 disclose a certain order of steps to be taken with respect to methods 300, 600, and 800, the steps comprising these methods may be completed in any suitable order. Furthermore, some or all steps of methods 300, 600, and 800 may be combined with steps from other methods of methods 300, 600, and 800.

Figure 9:
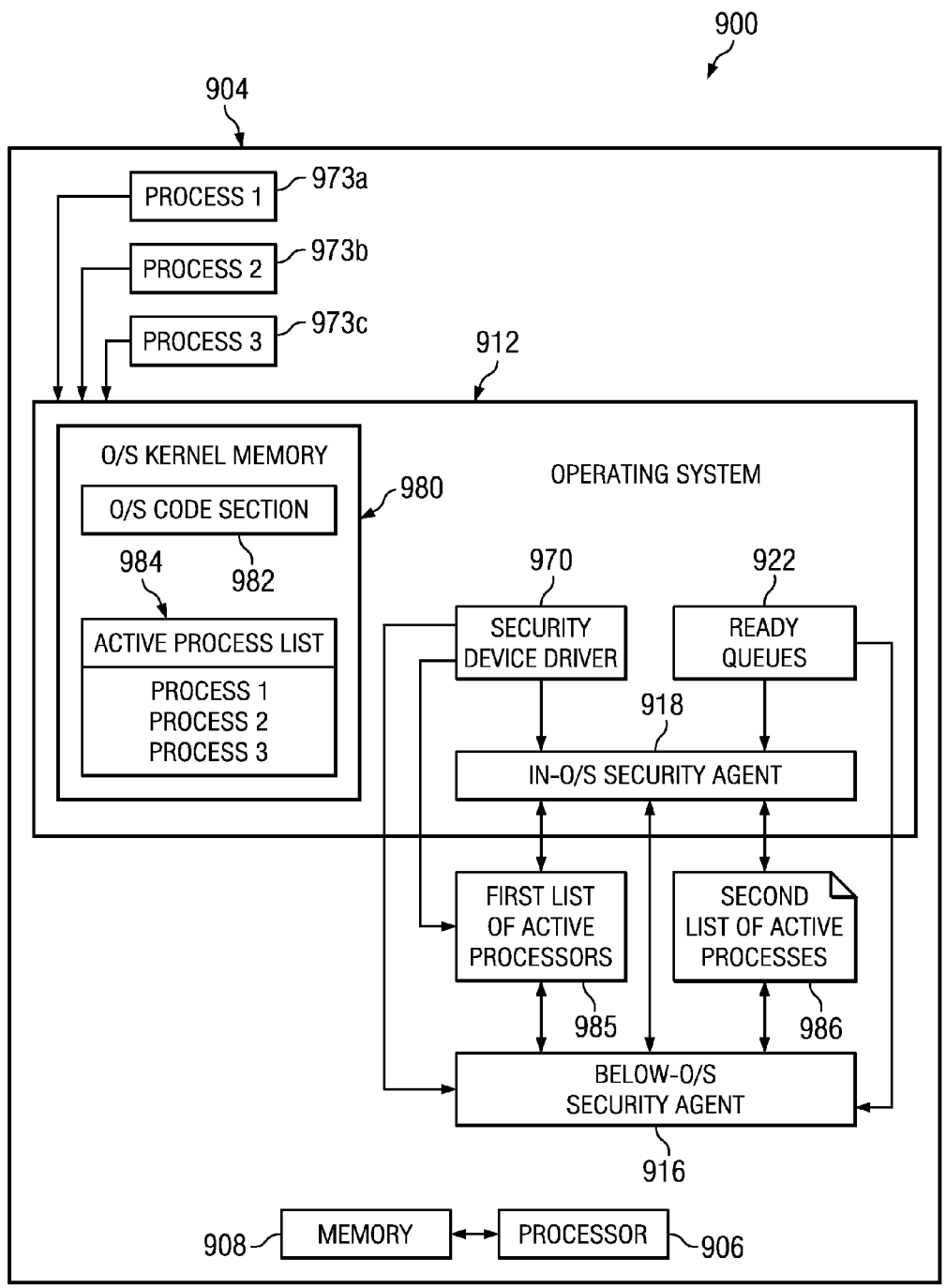
FIG. 9 is an example embodiment of a system for detecting and repairing hidden processes on an electronic device.

FIG. 9 is an example embodiment of a system 900 for detecting and repairing hidden processes on electronic device 904. An in-O/S security agent 918 and/or a below-O/S security agent 916 may operate on electronic device 904 to detect and repair malicious infections such as malware configured to hide the operation of a running process on electronic device 904. Electronic device 904 may include a processor 906 coupled to a memory 908, an operating system 912, and one or more processes 973. Electronic device 904 may be implemented wholly or in part by or configured to implement the functionality of electronic device 103 of FIG. 1, electronic device 204 of FIG. 2, electronic device 404 of FIG. 4, electronic device 701 of FIG. 7, and/or any combination thereof. Processor 906 may be implemented wholly or in part by or configured to implement the functionality of processor 208 of FIG. 2, processor 408 of FIG. 4, processor 702 of FIG. 7, and/or any combination thereof. Memory 908 may be implemented wholly or in part by or configured to implement the functionality of memory 206 of FIG. 2, memory 406 of FIG. 4, memory 703 of FIG. 7, and/or any combination thereof. Operating system 912 may be implemented wholly or in part by or configured to implement the functionality of operating systems 112 of FIG. 1, operating system 212 of FIG. 2, operating system 412 of FIG. 4, operating system 713 of FIG. 7, and/or any combination thereof. In-O/S security agent 918 may be implemented wholly or in part by or configured to implement the functionality of in-O/S security agent 218 of FIG. 2, in-O/S security agent 418 of FIG. 4, in-O/S security agent 719 of FIG. 7, and/or any combination thereof. Below-O/S security agent 916 may be implemented wholly or in part by or configured to implement the functionality of below-O/S trapping agent 104 of FIG. 1, SVMM security agent 217 or SVMM 216 of FIG. 2, firmware security agents 440, 442, PC firmware security agent 444, or below-O/S system agent 450 of FIG. 4, firmware security agent 516 of FIG. 5, microcode security agent 708 of FIG. 7, and/or any combination thereof.

Processes 973 may be configured to operate on electronic device 904. One or more processes 973 operating on electronic device 904 may be a malicious process associated with malware. Malware on electronic device 904 may operate to disguise the presence of one or more malicious processes of processes 973, to avoid detection by anti-malware software.

For example, operating system 912 may include operating system kernel memory 980. Operating system kernel memory 980 may include one or more mechanisms for tracking the execution of processes on electronic device 904. In one example, such a mechanism may include active process list 984. Active process list 384 may be implemented in a data structure, record, file, or any other suitable method for tracking the processes operating on electronic device 904. If, for example, process 973b is a malicious process associated with malware, malware on electronic device 904 may modify active process list 984 to remove the reference to process 973b. Thus, security software running on electronic device 904, when determining which processes are actively running on electronic device 904 and should be examined for malware, may not recognize process 973b as an active process for examination.

Operating system 912 may include ready queues 922. Ready queues 922 may include one or more suitable data structures (e.g., arrays, tables, lists, etc.) setting forth active threads operating on electronic device 904. An active process 973 may be comprised of one or more individual threads. A thread may be thought of as a unit of processing (e.g., one or more instructions) within an active process 973 that may be independently scheduled separate from other threads of the active process 973 for execution by electronic device 904. As an illustrative example of ready queues 922 in a Windows™ operating system, ready queues 922 may be implemented by a variable known as KiDispatcherReadyListHead. Ready queues 922 may also include various metadata regarding active threads, for example, an identifier of the process comprising the thread, an image name of such process, starting address, user mode address, device object, and/or other suitable information. In a Windows™ operating system, such active process information may be included in an executive thread ("ETHREAD") data structure associated with a thread.

During operation of system 900, in-O/S security agent 918 and/or below-O/S security agent 916 may spawn a security device driver 970 to execute on operating system 912. Security device driver 970 may be implemented in a driver, module, executable, DLL or any other suitable mechanism for providing kernel mode device driver services. Security device driver 970 may be configured to call various portions of operating system 912 to enumerate the processes which are running on electronic device 904. For example, security device driver 970 may be configured to examine kernel memory 980 or active process list 984. Security device driver 970 may be configured to communicate a first list of active processes 973 (e.g., active process list 984) that security device driver 970 is able to detect. Security device driver 970 may be configured to communicate active processes list 984 to in-O/S security agent 918 and/or below-O/S security agent 916. In one embodiment, security device driver 970 may be configured to pass the executive process ("EPROCESS") structure associated with a given detected process to below-O/S security agent 916 via a hypercall. Because security device driver 970 runs at the same or a less privileged ring of execution than an operating system, active processes enumerated by security device driver 970 may be limited to those active processes appearing on active process list 984, meaning malicious processes that have modified active process list 984 to remove reference to themselves may not be enumerated by security device driver 970. In the Windows™ operating system, security device driver 970 may be configured to use the function ZwQuerySystemInformation to request a process list from the operating system, identifying System_Process_Information to be determined. Below-O/S security agent 916 may be configured to use such functions as well, and may be more secure in performing such an action. Security device driver 970 may place enumerated processes in a first list 985 of active processes. In certain embodiments, first list 985 may be substantially equivalent to active process list 984. In other embodiments, a separate first list 985 may not be created, and security device driver 970 may instead use active process list 984 in lieu of such first list 985.

Conversely, in-O/S security agent 918 and/or below-O/S security agent 916 may run at the same or a more privileged ring of execution than operating system 912, and, accordingly, may be able to enumerate individual threads executing on electronic device 904. Based at least on such enumerated threads, in-O/S security agent 918 and/or below-O/S security agent 916 may determine all active processes 973 executing on electronic device 904, including malicious processes that may have removed references to themselves from active process list 984. For example, in certain embodiments, in-O/S security agent 918 and/or below-O/S security agent 916 may scan ready queues 922 and enumerate all threads in ready queues 922, placing the threads in a list. For every thread, in-O/S security agent 918 and/or below-O/S security agent 916 may locate the process owning the thread and other information regarding such process (e.g., by reference to metadata, such as ETHREAD information, associated with the thread), thus allowing in-O/S security agent 918 to enumerate a second list 986 of active processes 973, including malicious processes that may have removed references to themselves from active process list 984.

To further illustrate a specific embodiment, an ETHREAD data structure associated with a thread may include a number of metadata fields, include a ThreadsProcess field, a StartAddress field, a DeviceToVerify field, a Win32StartAddress field, and a ThreadListEntry field. By analyzing the ThreadsProcess field, in-O/S security agent 918 and/or below-O/S security agent 916 may be able to identify the process owning a thread, from which a process identifier and image name for the process may be determined. From StartAddress and Win32StartAddress, in-O/S security agent 918 and/or below-O/S security agent 916 may identify which code in memory is executing a process, thus allowing further identification of a suspicious driver, application, and/or other program should the process owning the thread be found to be suspicious. Based on DeviceToVerify, in-O/S security agent 918 and/or below-O/S security agent 916 may determine whether a device object is associated with a thread and thus, identify the driver object and malware driver should the process owning the thread be found to be suspicious. ThreadListEntry may assist enumeration of threads within the same process.

In-O/S security agent 918 may then compare the first list 985 of active processes 973 and the second list 986 of active processes 973, and identify active processes 973 appearing in the second list 986 and not appearing in the first list 985 as suspicious processes. Evidence of such a suspicious process may be evidence of malware hidden from anti-virus or anti-malware software running on electronic device 904, as well as operating system 912.

In other embodiments, below-O/S security agent 916 may scan ready queues 922 to enumerate threads and enumerate the second list 986 of active processes 973 based at least on the identified threads (e.g., by reference to metadata, such as ETHREAD information, associated with the threads). In such embodiments, below-O/S security agent 916 may receive the first list 985 of active processes generated by security device driver 970 from in-O/S security agent 918, or may access the first list 985 of active processes 973 by reading directly from memory. Below-O/S security agent 916 may then compare the first list 985 of active processes 973 and the second list 986 of active processes 973, and identify active processes 973 appearing in the second list 986 and not appearing in the first list 985 as suspicious. Such a suspicious process may be hidden from anti-virus or anti-malware software running on electronic device 904, as well as operating system 912. Evidence of such a suspicious process may be evidence of malware hidden from anti-virus or anti-malware software running on electronic device 904, as well as operating system 912.

If in-O/S security agent 918 and/or below-O/S security agent 916 determines that there is evidence of a hidden process running on electronic device 904, in-O/S security agent 918 and/or below-O/S security agent 916 may be configured to scan operating system 912, operating system kernel memory 980, or other elements of the electronic device 904 to determine whether any modifications have been made related to such a process. For example, in-O/S security agent 918 and/or below-O/S security agent 916 may be configured to scan for any memory modifications that are known to be conducted by malware. In some embodiments, in-O/S security agent 918 or below-O/S security agent 916 may be configured to scan operating system code section 382, as well as active process list 384. In these and other embodiments, in-O/S security agent 918 and/or below-O/S security agent 916 may utilize thread metadata (e.g., ETHREAD information) of threads associated with suspicious processes to determine elements of electronic device 904 and/or portions thereof to scan for modifications.

If malicious modifications are found, in-O/S security agent 918 or below-O/S security agent 916 may take corrective action. For example, in-O/S security agent 918 or below-O/S security agent 916 may be configured to repair any malicious modifications found in the operating system kernel memory 980. As another example, in-O/S security agent 918 or below-O/S security agent 916 may be configured to remove any detected root kit infections determined through its inspections of memory modifications in operating system kernel memory 380. As a further example, in-O/S security agent 918 or below-O/S security agent 916 may be configured to repair any infections to any internal data structure or code sections. In these and other embodiments, in-O/S security agent 918 and/or below-O/S security agent 916 may utilize thread metadata (e.g., ETHREAD information) of threads associated with suspicious processes to determine corrective action to be taken (e.g., such metadata may identify particular memory locations of malware processes, drivers responsible for suspicious behavior, etc.). In-O/S security agent 918 or below-O/S security agent 916 may be configured to repeat the process of scanning for modifications by a hidden process for every discrepancy found between the first list 985 of processes determined by security device driver 970 and the second list 986 of processes determined from analysis of thread metadata present in ready queues 922.

Figure 10:
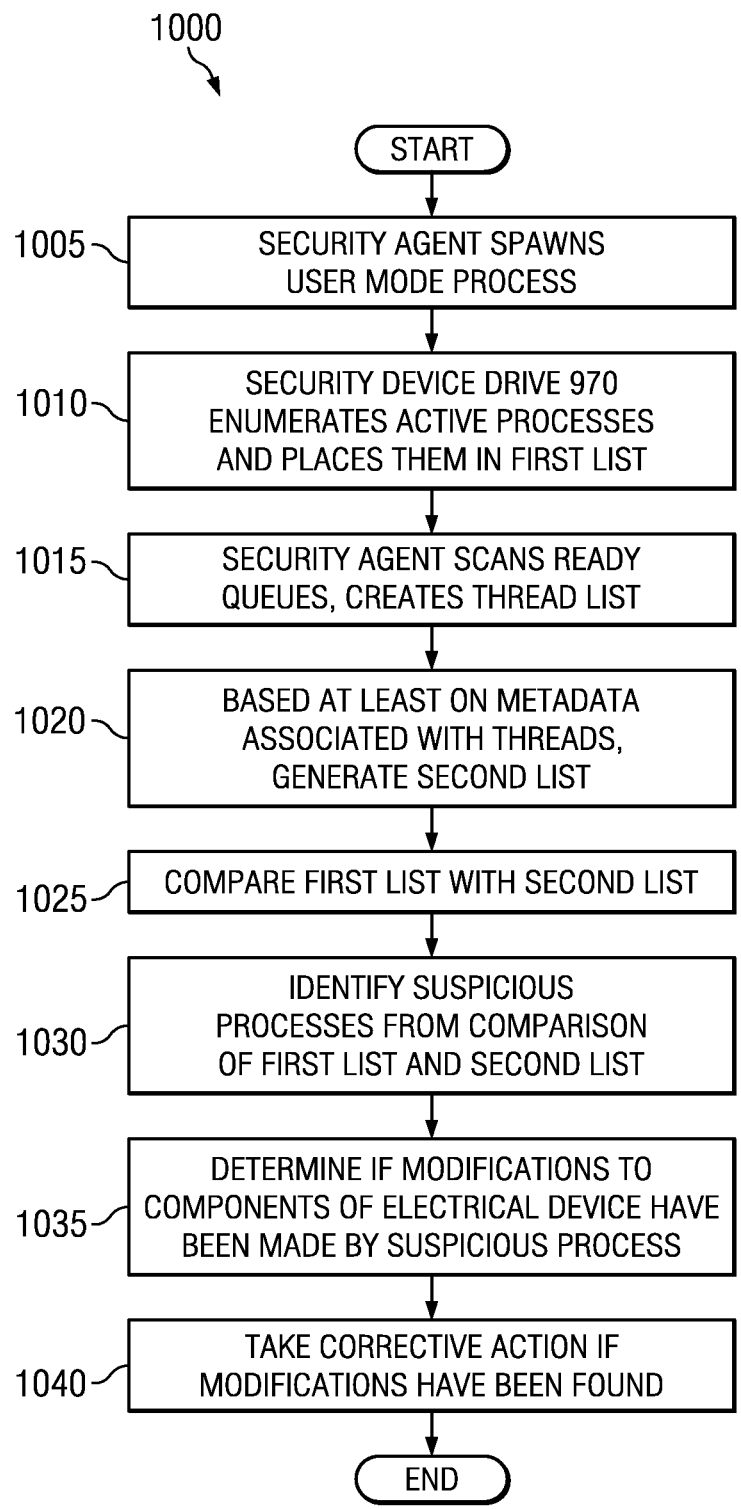
FIG. 10 is an example embodiment of a method for detecting and repairing hidden processes on an electronic device.

FIG. 10 is an example embodiment of a method for detecting and repairing hidden processes on an electronic device. In step 1005, one or more security agents (e.g., in-O/S security agent 918 and/or below-O/S security agent 916) may spawn a security device driver to execute on an operating system of an electronic device. In step 1010, the security device driver may enumerate active processes running on the electronic device via standard system calls to an operating system of the electronic device. The security device driver may place enumerated processes in a first list of active processes. Because the security device driver may run at the same or a less privileged ring of execution than an operating system, the active processes enumerated by the security device driver may be limited to those active processes appearing on an active process list of an operating system, meaning malicious processes that have modified the active process list to remove reference to themselves may not be enumerated by the security device driver.

In step 1015, the one or more security agents may scan thread ready queues, and based at least on such scan, enumerate individual threads executing on electronic device and place them in a thread list. In step 1020, based at least on metadata associated with the threads (e.g., ETHREAD information associated with the threads or other metadata setting forth processes owning the threads), the one or more security agents may locate processes owning the threads and generate a second list of active processes. The second list may include malicious processes that may have removed references to themselves from the active process list.

In step 1025, one or more security agents may compare the first list of active processes and the second list of active processes. In step 1030, the one or more security agents may identify active processes appearing in the second list and not appearing in the first list as suspicious processes. Evidence of such a suspicious process may be evidence of malware hidden from anti-virus or anti-malware software running on an electronic device and/or an operating system executing on the electronic device.

In step 1035, if the one or more security agents determine that there is evidence of a hidden process running on the electronic device, the one or more security agents may determine if modifications to portions of the electronic device have been made by the suspicious process. To determine if modifications have been made, the one or more security agents may scan an operating system and/or operating system kernel memory to determine whether any modifications have been made related to such a process. For example, the one or more security agents may scan for any memory modifications that are known to be conducted by malware, and/or may scan an operating system code section of operating system kernel memory and/or active process list.

In step 1040, the one or more security agents may take corrective action if modification have been found. For example, the one or more security agents may repair any malicious modifications found in the operating system kernel memory. As another example, the one or more security agents may remove any detected root kit infections determined through its inspections of memory modifications in operating system kernel memory. As a further example, the one or more security agents may repair any infections to any internal data structure or code sections. Portions of method 1000 may be repeated for each identified suspicious process. Accordingly, the one or more security agents may repeat the process of scanning for modifications by a hidden process for every discrepancy found between the first list of processes determined by the security device driver and the second list of processes determined from analysis of thread metadata present in ready queues.

Advantageously, the methods and systems described above with reference to FIGS. 9 and 10 may provide for identification of rootkits and/or other malware, without a requirement to hook or trap on any function of an operating system kernel.

Figure 11:
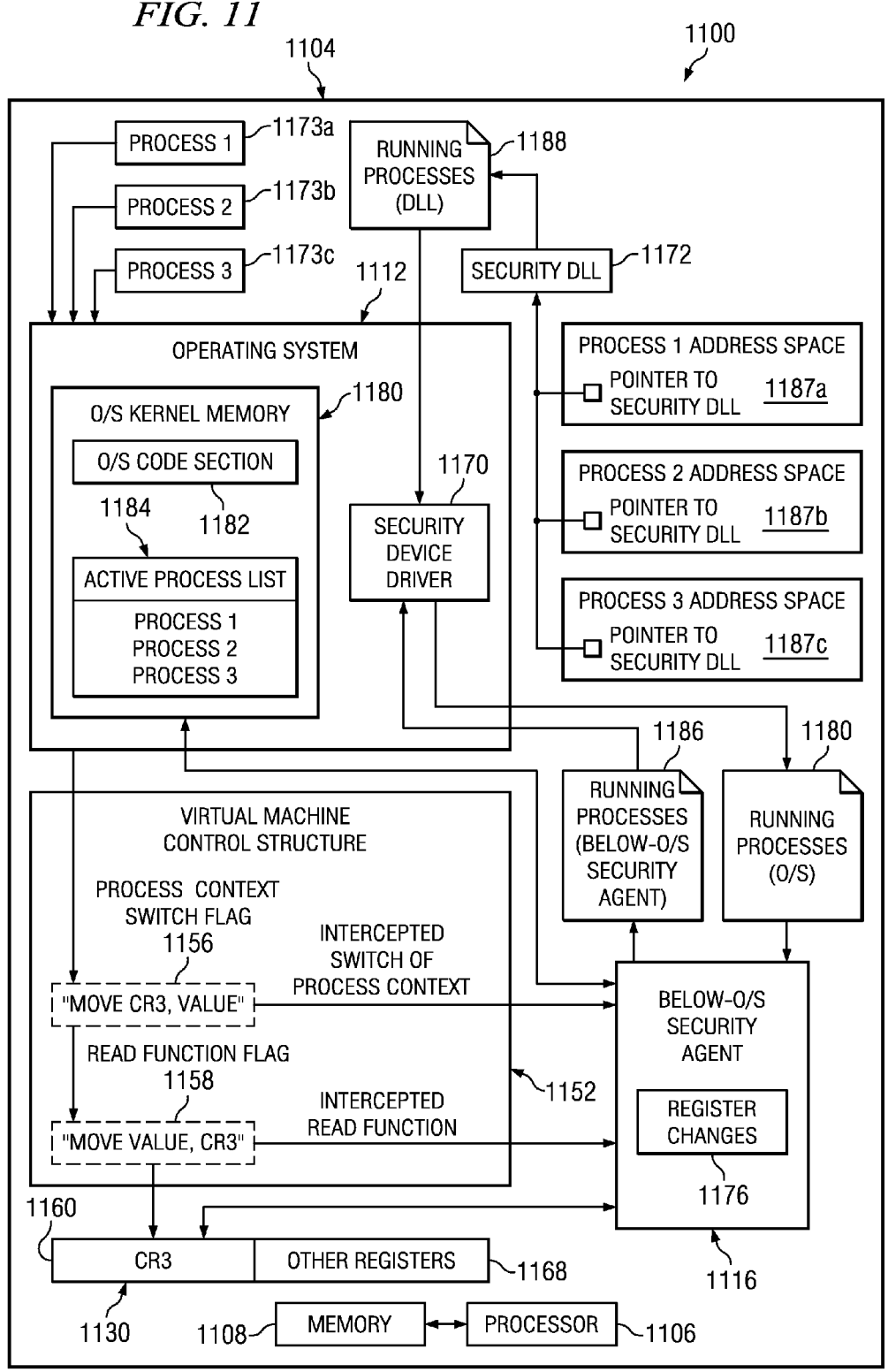
FIG. 11 is an example embodiment of another system for detecting and repairing hidden processes on electronic device.

FIG. 11 is an example embodiment of a system 1100 for detecting and repairing hidden processes on an electronic device 1104. A below-O/S security agent 1116, a security device driver 1170, and a security dynamic-linked library (DLL) 1172 may operate on electronic device 1104 to detect and repair malicious infections such as malware configured to hide the operation of a running process on electronic device 1104. Electronic device 1104 may include a processor 1106 coupled to a memory 1108, an operating system 1112, security DLL 1172, below-O/S security agent 1116, a virtual machine control structure 1152 ("VMCS"), one or more processes 1173 (e.g., process 1173a, 1173b, and 1173c), address spaces 1187 (e.g., address spaces 1187a, 1187b, and 1187c) associated with such processes, and one or more system resources, such as a control register like CR3 control register 1160. Processor registers 1130 may include such registers as, for example, CR3 register 1160 or any other registers 1168. Although CR3 is given as an example of a processor register 1130, any suitable control register may be used. CR3 register 1160 may be a processor register configured to control or change the general behavior of a CPU on electronic device 1104. CR3 register 1160 may be configured to enable a processor such as processor 1106 running on electronic device 1104 to translate a virtual memory address into a physical memory address. CR3 register 1160 may be configured to locate a page directory and page tables for a currently requested task, such as one residing in stack and selected for operation by O/S scheduler. CR3 register 1160 may be implemented in any suitable virtual addressing control register. Other registers 268 may be present in processor registers 1130, according to the particular design or implementation of electronic device 1104. Processor registers 1130 may be associated with processor 1106, or another processor of electronic device 1104.

Electronic device 1104 may be implemented wholly or in part by or configured to implement the functionality of the electronic device 103 of FIG. 1, electronic device 204 of FIG. 2, electronic device 404 of FIG. 4, electronic device 701 of FIG. 7, electronic device 904 of FIG. 9, and/or any combination thereof. Processor 1106 may be implemented wholly or in part by or configured to implement the functionality of processor 208 of FIG. 2, processor 408 of FIG. 4, processor 702 of FIG. 7, processor 906 of FIG. 9, and/or any combination thereof. Memory 1108 may be implemented wholly or in part by or configured to implement the functionality of memory 206 of FIG. 2, memory 406 of FIG. 4, memory 703 of FIG. 7, memory 908 of FIG. 9, and/or any combination thereof. Operating system 1112 may be implemented wholly or in part by or configured to implement the functionality of operating systems 112 of FIG. 1, operating system 212 of FIG. 2, operating system 412 of FIG. 4, operating system 713 of FIG. 7, operating system 912 of FIG. 9, and/or any combination thereof. In-O/S security agent 1118 may be implemented wholly or in part by or configured to implement the functionality of in-O/S security agent 218 of FIG. 2, in-O/S security agent 418 of FIG. 4, in-O/S security agent 719 of FIG. 7, in-O/S security agent 918 of FIG. 9, and/or any combination thereof. Below-O/S security agent 1116 may be implemented wholly or in part by or configured to implement the functionality of below-O/S trapping agent 104 of FIG. 1, SVMM security agent 217 or SVMM 216 of FIG. 2, firmware security agents 440, 442, PC firmware security agent 444 or below-O/S system agent 450 of FIG. 4, firmware security agent 516 of FIG. 5, microcode security agent 708 of FIG. 7, below-O/S security agent 916 of FIG. 9, and/or any combination thereof.

Electronic device 1104 may include a virtual machine control structure 1152. In one embodiment, virtual machine control structure 1152 may reside in below-O/S security agent 1116. In another embodiment, virtual machine control structure 1152 may be communicatively coupled to below-O/S security agent 1116. In such an embodiment, some or all of the functionality of virtual machine control structure 1152 may be accomplished by below-O/S security agent 1116. Furthermore, in such an embodiment some or all of the functionality of below-O/S security agent 1116 may be accomplished by virtual machine control structure 1152. Virtual machine control structure 1152 may be implemented fully or in part by below-O/S trapping agent 104 of FIG. 1, VMCS of FIG. 2, firmware security agents 440, 442 or PC firmware security agent 444 of FIG. 4, firmware security agent 516 of FIG. 5, or microcode security agent 706 of FIG. 7. Virtual machine control structure 1152 may be implemented in a data structure, record, file, module, or any other suitable entity for trapping requests to resources such as processor registers 1130 or other resources. In one embodiment, such as where system 1100 may be implemented fully or in part by the system 200 of FIG. 2, virtual machine control structure 1152 and below-O/S security agent 1116 may be configured to virtualize access to system resources of electronic device 1104 such as processor registers 1130 or any other suitable system resources.

Virtual machine control structure 1152 may include one or more flags 1154 for trapping requested operations by operating system 1112 of system resources such as processor registers 1130. Flags 1154 may include flags to trap, for example, a process context switch flag 1156 and/or a read function flag 1158. Flags 1154 may include any flag suitable for trapping access to system resources such as processor registers 1130. Below-O/S security agent 1116 may be configured to set which flags 1154 of virtual machine control structure 1152 will be used to trap access to system resources. The system resources which may be trapped and/or guarded by virtual machine control structure 1152 and below-O/S security agent 1116 may include, but are not limited to, processor registers 1130.

Processes 1173 may be configured to operate on electronic device 1104. One or more processes 1173 operating on electronic device 1104 may be a malicious process associated with malware. Malware on electronic device 1104 may operate to disguise the presence of one or more malicious processes of processes 1173 to avoid detection by anti-malware software. For example, operating system 1112 may include operating system kernel memory 1180. Operating system kernel memory 1180 may include one or more mechanisms for tracking the execution of processes on electronic device 1104. In one example, such a mechanism may include active process list 1184. Active process list 1184 may be implemented in a data structure, record, file, or any other suitable method for tracking the processes operating on electronic device 1104. If, for example, process 1173b is a malicious process associated with malware, malware on electronic device 1104 may modify active process list 1184 to remove the reference to process 1173b. Thus, security software running on electronic device 1104, when determining which processes are actively running on electronic device 1104 and should be examined for malware, will not recognize process 1173b as an active process for examination.

Processes 1173, or other entities operating on electronic device 1104, may require use of a process context switch associated with one of processes 1173 as part of normal operations when using virtualized memory. To facilitate the use of virtualized memory, operating system 1112 may be configured to conduct a process context switch, read, or attachment to a given process. Such actions may require operating system 1112 to attempt to access system resources, including a control register such as CR3 register 1160. Operating system 1112 may generate a read of CR3 register 1160, in the form of the command "move value, CR3". Operating system 1112 may be configured to attempt to change the value of CR3 register 1160, in the form of a command of "move CR3, value".

Virtual machine control structure 1152 may be configured to intercept attempts by operating system 1112 to access the system resources of electronic device 1104, including registers 1130. Virtual machine control structure 1152 may be configured to attempt to trap certain attempted commands by operating system 1112 to access system resources of electronic device 1104. Virtual machine control structure 1152 may be configured to use flags to intercept commands of operating system 1112. In one embodiment, virtual machine control structure 1152 may include flags 1156-1158 to intercept the process context switch and read commands upon CR3 register 1160. Below-O/S security agent 1116 may be configured to set such flags 1156-1158 inside virtual machine control structure 1152. Virtual machine control structure 1152 may be configured to generate a VM exit, the event generated upon interception of a flagged operation, such as a read or process context switch command associated with CR3 register 1160. In one embodiment, virtual machine control structure 1152 may be configured to generate a VM exit for any attempted access of a control register associated with virtualized memory. Each time one of the processes 1173 running on electronic device 1104 attempts to conduct a process context switch, or read the process space associated with a process, virtual machine control structure 1152 may be configured to generate a VM exit and transfer information about the attempted command to below-O/S security agent 1116. to illustrate, below-O/S security agent 1116 may be configured to record all such actions upon CR3 register 1160 (or another register 1168) in register changes 1176. Register changes 1176 may be implemented in a file, structure, data structure, record, or any other suitable mechanism for storing a history of the changes to CR3 register 1160 or another register 1168. Below-O/S security agent 1116, by recording all accesses of CR3 register 1160, may thus have a record of all processes 1173 that have attempted a process context switch in electronic device 1104. Such a record of changes as register changes 1176 may be configured to serve as a record of processes running on electronic device 1104. Below-O/S security agent 1116 may be configured to determine from register changes 1176 a list of running processes 1186, including all processes that are running on electronic device 1104.

By intercepting accesses to the CR3 register, below-O/S security agent 1116 may be capable of freezing execution by denying the ability of processes to be swapped in and out of execution. By freezing execution, below-O/S security agent 1116 may be configured to gather lists of running processes without entering into race conditions with malware, which may be working to avoid or subvert corrective or detection measures.

Alternatively, below-O/S security agent 1116 may be configured to determine list of running processes 1186 by monitoring operating systems functions for context switching (e.g., the Windows™ function SwapContext). The monitoring of operating system context switching functions may be performed via processor-level monitoring of memory associated with code sections of the function call or through observation of the execution instruction pointer ("EIP") pointing to such code sections. For example, the memory location, physical or virtual, in which SwapContext resides may be mapped and described in a security rule. A flag for the physical address or virtual memory address where SwapContext resides may be set so that any attempted execution of the memory may be trapped. For example, if below-O/S security agent 1116 is implemented fully or in part by SVMM security agent 217 of FIG. 2, then below-O/S security agent 1116 may set VMCS 1152 to trap an attempted execution of the virtual memory page in which SwapContext resides. In another example, if below-O/S security agent 1116 is implemented fully or in part by microcode security agent 708 of FIG. 7, then below-O/S security agent 1116 may set VMCS 1152 to trap an attempted execution of the physical memory address which begins the code section of the SwapContext function.

Operating system 1112 may include security device driver 1170. Security device driver 1170 may be implemented in a driver, module, executable, DLL or any other suitable mechanism for providing kernel mode device driver services. Security device driver 1170 may be configured to call various portions of operating system 1112 to enumerate the running processes which are running on electronic device 1104. For example, security device driver 1170 may be configured to examine kernel memory 1180, or active process list 1184. Security device driver 1170 may be configured to communicate running processes list 1180 that the security device driver 1170 can detect. Security device driver 1170 may be configured to communicate running processes list 1180 to below-O/S security agent 1116. In one embodiment, security device driver 1170 may be configured to pass the EPROCESS structure associated with a given detected process to below-O/S security agent 1116 via a hypercall. Upon receipt of the EPROCESS structures of the active processes detected by security device driver 1170, below-O/S security agent 1116 may be configured to calculate the CR3 register 1160 values (or other register 1168 values) associated with each such EPROCESS structure received from security device driver 1170. Below-O/S security agent 1116 may be configured to compare the running processes list 1180 received from security device driver 1170 with the running processes list 1186 which below-O/S security agent 1116 determined from register changes 1176. Below-O/S security agent 1116 may be configured to determine whether any CR3 values derived from the running processes list 1180 from security device driver 1170 are missing, compared to the register changes 1176 that below-O/S security agent 1116 has compiled. Such a discrepancy may indicate a hidden process. Such a process may be hidden from security device driver 1170, any anti-virus or anti-malware software running on electronic device 1104, as well as operating system 1112. However, evidence of such a process may have been visible to below-O/S security agent 1116 because such a hidden process attempted, for example, a process context switch or read of a process address space. Such evidence of a hidden process may be evidence of a kernel mode infection via a kernel root device driver, because the kernel mode security device driver 1170 was not able to detect the hidden process.

Below-O/S security agent 1116 may determine a missing process that is not a hidden process, but is instead a process that was deleted in the normal course of execution between the time the lists were compiled. To help prevent misidentifying such threads as hidden processes, below-O/S security agent 1116 may be configured to monitor the execution of functions for creating and deleting processes. Such functions may include, for example, pspProcessCreate or pspTerminateProcess. Below-O/S security agent 1116 may be configured to make time-stamp records of its enumeration actions and of observing creation or deletion functions, so that if a process is missing, it may determine whether the process was deleted with a deletion function before the process was identified as missing.

If below-O/S security agent 1116 determines that there is evidence of a hidden process running on electronic device 1104, below-O/S security agent 1116 may be configured to scan operating system 1112 and operating system kernel memory 1180 to determine whether any modifications have been made related to such a process. Below-O/S security agent 1116 may be configured to scan for any memory modifications that are known to be conducted by malware. In some embodiments, below-O/S security agent 1116 may be configured to scan operating system code section 1182, as well as active process list 1184. Below-O/S security agent 1116 may be configured to repair any malicious modifications found in the operating system kernel memory 1180. Below-O/S security agent 1116 may be configured to remove any detected root kit infections determined through its inspections of memory modifications in operating system kernel memory 1180. Below-O/S security agent 1116 may be configured to repair any infections to any internal data structure or code sections. Below-O/S security agent 1116 may be configured to repeat the process of scanning for memory modifications for a hidden process for every discrepancy found between the processes determined by below-O/S security agent 1116 and security device driver 1170. Security device driver 1170 may be configured to receive a final process list from below-O/S security agent 1116, such as running processes list 1186. Security device driver 1170 may be configured to access running processes list 1186 through a hypercall to below-O/S security agent 1116.

Security DLL 1172 may be configured to operate on electronic device 1104. Security DLL 1172 may be implemented in a dynamic linked library (DLL), shared library, executable, or any other suitable mechanism for performing its functions as described below. Security device driver 1170 may be configured to inject security DLL 1172, or a reference to security DLL 1172, into the address space of each process running on electronic device 1104, such as process address spaces 1187. Each of process address spaces 1187 may thus contain a pointer to security DLL 1172. Security DLL 1172 may be configured to enumerate all user mode processes running on electronic device 1104. Security DLL 1172 may be configured to use any suitable technique to enumerate user mode processes. For example, security DLL 1172 may be configured to use the NtQuerySystemInformation function in the Windows™ operating system, and navigate processes using ProcessFirst and ProcessNext functions. Such functions may also be performed by a below-O/S security agent. Security DLL 1172 may be configured to compile its results into running processes list 1188. Security DLL 1172 may be configured to send running processes list 1188 to security device driver 1170. Security DLL 1172 may be configured to send such running processes list 1188 via secured input and output calls. Security device driver 1170 may be configured to compare the received running processes list 1188 against the list of running processes list 1186 it received from below-O/S security agent 1116. Security device driver 1170 may be configured to determine that any differences in such process lists may include a user mode root kit attack. Security device driver 1170 or security DLL 1172 may be configured to examine the process code and data sections in memory associated with process address spaces 1187, to determine whether any memory modifications have been made. Security device driver 1170 may be configured to repair any memory modifications made in process address spaces 1187. Security device driver 1170 may be configured to repeat the process of scanning process address spaces 1187, detecting memory modifications, and repairing such memory modifications, for each discrepancy found between running processes list 1188 from security DLL 1172 and running processes list 1186 from below-O/S security agent 1116.

In operation, processes 1173 may be operating on electronic device 1104. One or more of processes 1173 may be hidden. For example, process 1173b may be associated with malware, and may be hidden to disguise its malicious operations from antivirus or anti-malware software running on electronic device 1104. Processes 1173 may access system resources of electronic device 1104 through operating system 1112. Processes 1173, in order to access different portions of memory, or in order to be executed by a processor 1108, may require accessing a control register of electronic device 1104. Such an access may include causing a process context switch, or reading of a process address space. Such requirements may be handled by operating system 1112, wherein operating system 1112 accesses a register such as CR3 register 1160. Virtual machine control structure 1152 may intercept such requests and generate a VM exit for the request. Virtual machine control structure 1152 may provide information associated with such attempts to below-O/S security agent 1116. Below-O/S security agent 1116 may set flags such as those to trap the instructions "move CR3, value" 1156 or "move value, CR3" 1158 on virtual machine control structure 1152. Below-O/S security agent 1116 may record all attempted reads or changes to CR3 register 1160 and register changes 1176.

To determine whether one or more processes 1173 running on electronic device 1104 are hidden, security device driver 1170 may determine from operating system 1112 what kernel mode processes are running on operating system 1112. Security device driver 1170 may determine such processes by scanning portions of operating system kernel memory 1180 such as active process list 1184. Security device driver 1170 may thus have a list of running processes list 1180 that it is able to detect operating in the kernel mode of electronic device 1104. Security device driver 1170 may send running processes list 1180 to below-O/S security agent 1116. Security device driver 1170 may send running processes list 1180 to below-O/S security agent 1116 by passing the EPROCESS structure of each process detected in running processes list 1180 to below-O/S security agent 1116 via a hypercall. Below-O/S security agent 1116 may calculate the CR3 values of each such EPROCESS contained within running processes list 1180. Below-O/S security agent 1116 may then compare the CR3 values arising from the security device driver 1170 in running processes list 1180, versus the register changes 1176 that it has compiled during the operating of electronic device 1104. Any discrepancies between running processes list 1180 and register changes 1176 may be the result of one or more of processes 1173 being hidden on electronic device 1104.

If below-O/S security agent 1116 determines that there is evidence of a hidden process running on electronic device 1104, below-O/S security agent 1116 may scan operating system 1112 and operating system kernel memory 1180 to determine whether any modifications have been made related to such a process. Below-O/S security agent 1116 may scan for any memory modifications that are known to be conducted by malware. In one embodiment, below-O/S security agent 1116 may scan operating system code section 1182, as well as active process list 1184, for memory modifications. Below-O/S security agent 1116 may repair any malicious modifications found in operating system kernel memory 1180. Below-O/S security agent 1116 may remove any detected root kit infections determined through its inspections of memory modifications in operating system kernel memory 1180, or repair any infections to any internal data structure or code sections. Below-O/S security agent 1116 may be configured to repeat the process of scanning for memory modifications for a hidden process for each discrepancy found between the processes determined by below-O/S security agent 1116 and security device driver 1170. Below-O/S security agent 1116 may generate a final process list such as running processes list 1186 and send such a list to security device driver 1170.

Security device driver 1170 may inject security DLL 1172, or a reference to security DLL 1172, into the address space of each process running on electronic device 1104, such as running processes list 1186. Each of process address spaces 1187 may thus contain a pointer to security DLL 1172. Security DLL 1172 may enumerate all user mode processes running on electronic device 1104. Security DLL 1172 may compile its results into running processes list 1188 and send running processes list 1188 to security device driver 1170.

Security device driver 1170 may compare the received running processes list 1188 against the list of running processes list 1186 received from below-O/S security agent 1116. Security device driver 1170 may determine that any differences in such process lists may indicate a malware infection, such as a user mode root kit attack. Security device driver 1170 may examine the process code and data sections in memory associated with process address spaces 1187, to determine whether any memory modifications have been made and make any necessary repairs. Security device driver 1170 may repeat the process of scanning process address spaces 1187, detecting memory modifications, and repairing such memory modifications, for each discrepancy found between running processes list 1188 from security DLL 1172 and running processes list 1186 from below-O/S security agent 1116.

Figure 12:
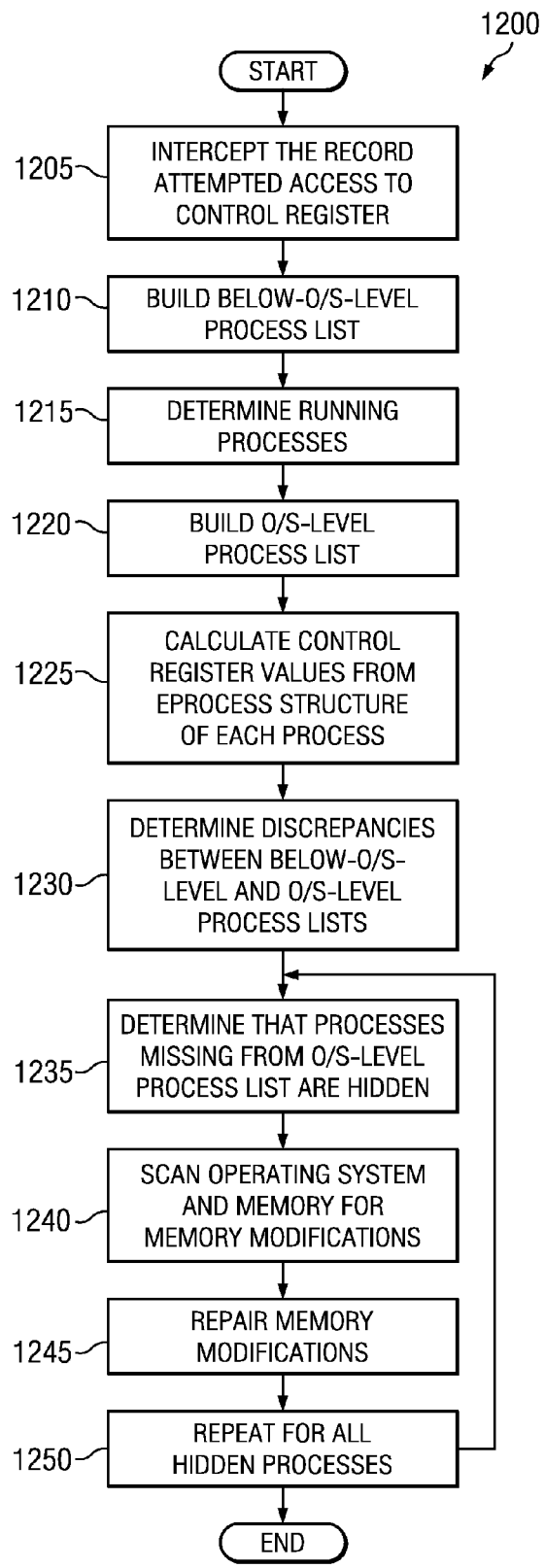
FIG. 12 is an example embodiment of another method for detecting and repairing hidden processes on an electronic device.

FIG. 12 is an example embodiment of a method 1200 for detecting and repairing hidden processes on an electronic device.

In step 1205, attempted access of a control register may be intercepted and recorded. Such a control register may be a CR3 control register. Such attempted access may be intercepted by trapping a VM exit. Such an interception may be implemented by setting a flag in a virtual machine control structure. Step 1205 may be repeated so as to build a below-O/S-level process list in step 1210, which may include records of all the processes accessing the control register for a given time period. In a system using virtual memory, the control register may be accessed to switch and access such virtual memory. Steps 1205-1210 may be implemented with the assistance of a below-O/S security agent. Steps 1205-1210 may be repeated, periodically or as-needed, during the operation of method 1200 as needed, to provide an updated baseline for the various comparisons to be made in method 1200.

In step 1215, the processes running on an operating system of the electronic device may be determined from the perspective of the kernel mode of the operating system. Such processes may be determined by using enumeration functions of the kernel mode of the operating system. For example, the active process list of the operating system may be accessed to determine the running processes. In step 1220, such processes may be used to build an O/S-level process list. In step 1225, the control register values from the EPROCESS structure of each process in the O/S-level process list may be calculated. Such register values may allow the process to be cross-referenced in the O/S-level process list.

In step 1230, the below-O/S-level and O/S-level process lists may be compared to determine whether any discrepancies exist. If there are any processes missing from O/S-level process list that are in the below-O/S-level process list, in step 1235 it may be determined that such processes may be hidden and thus malicious.

In step 1240, the operating system and system memory may be scanned for memory modifications associated with the hidden process. In one embodiment, such resources may be scanned for process enumeration related alterations. For example, the operating system code sections and/or the operating system active process list may be scanned. In step 1245, any detected memory modifications may be repaired. In step 1250, steps 1205-1245 may be repeated for all hidden processes, until no discrepancies exist between the elements of the below-O/S-level process list and the O/S-level process list.

Figure 13:
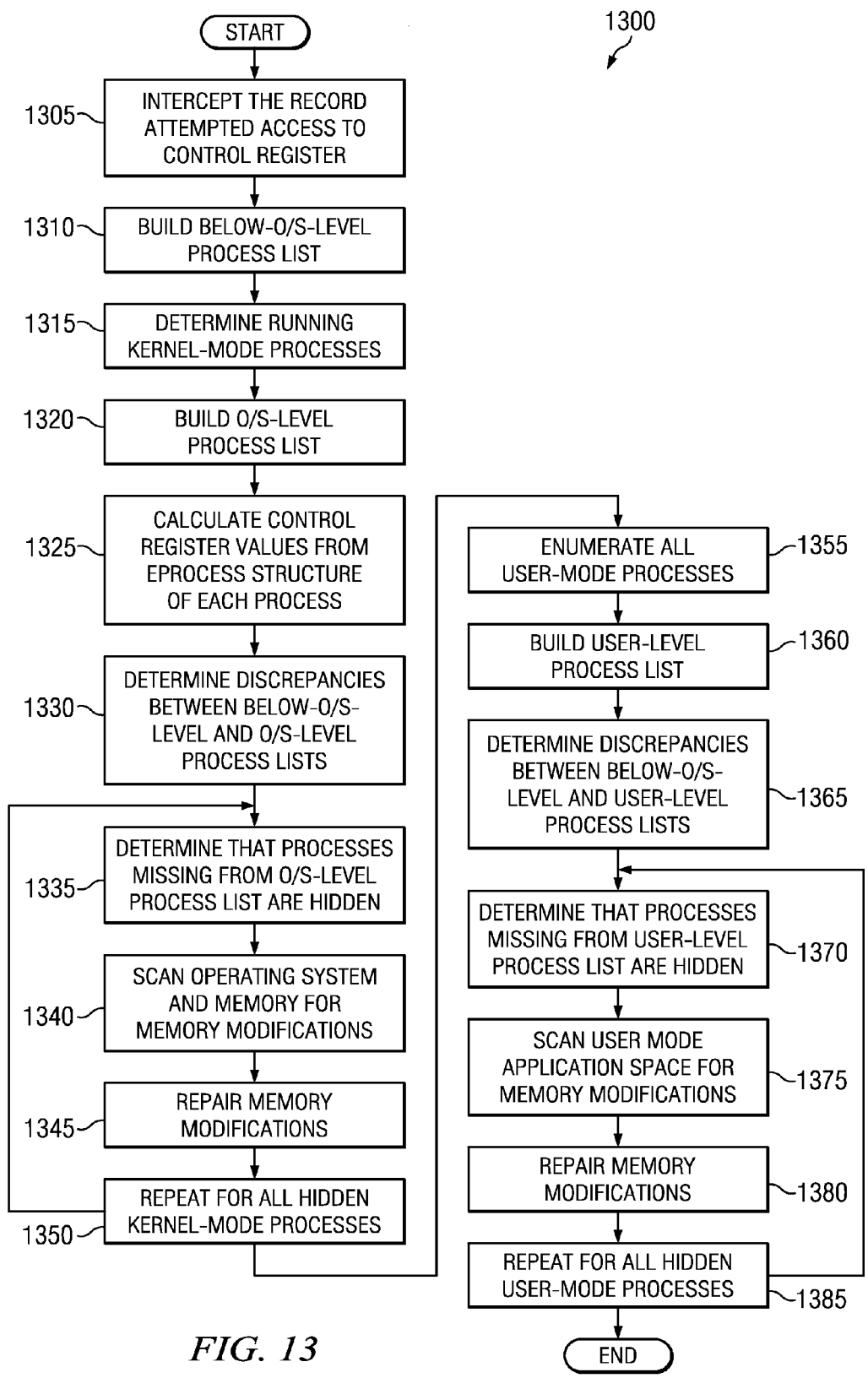
FIG. 13 is an example embodiment of yet another method for detecting and repairing hidden processes on an electronic device.

FIG. 13 is an example embodiment of a method 1300 for detecting and repairing hidden processes on an electronic device. Method 1300 is different from method 1200 in that method 1200 involves the creation and comparison of lists that include both kernel-mode and user-mode processes, while method 1300 involves the separate creation and comparison of kernel-mode processes lists and user-mode processor lists. By comparing the presence of processes in one list and not the other, qualities of the malware process may be determined, such as whether the malware is a user-mode rootkit or a kernel-mode rootkit. Also, the rootkit may have infected one or many processes.

In step 1305, attempted access of a control register may be intercepted and recorded. Such a control register may be a CR3 control register. Such attempted access may be intercepted by trapping a VM exit. Such an interception may be implemented by setting a flag in a virtual machine control structure. Step 1305 may be repeated so as to build a below-O/S-level process list in step 1310, which may include records of all the processes accessing the control register for a given time period. In a system using virtual memory, the control register may be accessed to switch and access such virtual memory. Steps 1305-1310 may be implemented with the assistance of a below-O/S security agent. Steps 1305-1310 may be repeated, periodically or as-needed, during the operation of method 1300 as needed, to provide an updated baseline for the various comparisons to be made in method 1300.

In step 1315, the processes running in the kernel mode of an operating system of the electronic device may be determined, from the perspective of the kernel mode of the operating system. Such processes may be determined by using enumeration functions of the kernel mode of the operating system. For example, the active process list of the operating system may be accessed to determine the processes running in kernel mode. In step 1320, such processes may be used to build an O/S-level process list. In step 1325, the control register values from the EPROCESS structure of each process in the O/S-level process list may be calculated. Such register values may allow the process to be cross-referenced in the O/S-level process list.

In step 1330, the below-O/S-level and O/S-level process lists may be compared to determine whether any discrepancies exist. If there are any processes missing from O/S-level process list that are in the below-O/S-level process list, in step 1335 it may be determined that such processes may be hidden and thus malicious, possibly taking the form of a kernel-mode rootkit. In one embodiment, it may be determined that, alternatively, processes missing from O/S-level process list are in fact user-mode processes. In such an embodiment, step 1315 may not have enumerated user-mode processes of the electronic device.

In step 1340, the operating system and system memory may be scanned for memory modifications associated with the hidden process. In one embodiment, such resources may be scanned for process enumeration related alterations. For example, the operating system code sections and/or the operating system active process list may be scanned. In step 1345, any detected memory modifications may be repaired. In step 1350, steps 1305-1345 may be repeated for all hidden kernel-mode processes, until no discrepancies exist between the kernel-mode elements of the below-O/S-level process list and the O/S-level process list.

In step 1355, the user-mode processes of the electronic device may be determined and enumerated. Step 1355 may be implemented by injecting a shared library into the address space of each running process. The shared library may call the user mode process enumeration functions of the operating system. In step 1360, a user-level process list may be created with the results of step 1355. In step 1365, discrepancies between the below-O/S-level and user-level process lists may be determined. Any processes not found in the user-level process list, and not previously found in the O/S-level process list, may be hidden user-mode processes, and thus associated with malware. In step 1370, the application and process spaces of the user mode may be scanned for memory modifications. The process code of the address spaces into which the shared library was injected may be examined for such memory modifications. The portions of memory hosting user-mode process code as well as data sections may be scanned in step 1375. In step 1380, any detected memory modifications may be repaired. In step 1385, steps 1355-1380 may be repeated, until no discrepancies exist between the user-mode elements of the below-O/S-level process list and the user-level process list.

Although FIGS. 3, 6, 8, 10, 12, and 13 disclose a particular number of steps to be taken with respect to example methods 300, 600, 800, 1000, 1200, and 1300, methods 300, 600, 800, 1000, 1200, and 1300 may be executed with more or fewer steps than those depicted in FIGS. 3, 6, 8, 10, 12, and 13. In addition, although FIGS. 3, 6, 8, 10, 12, and 13 disclose a certain order of steps to be taken with respect to methods 300, 600, 800, 1000, 1200, and 1300 the steps comprising these methods may be completed in any suitable order. Furthermore, some or all steps of methods 300, 600, 800, 1000, 1200, and 1300 may be combined with steps from other methods of methods 300, 600, 800, 1000, 1200, and 1300.

Methods 300, 600, 800, 1000, 1200, and 1300 may be implemented using the systems of FIGS. 1-2, 4-5, 7, 9 and 11. In certain embodiments, methods 300, 600, 800, 1000, 1200, and 1300 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as non-transitory communications media and/or any combination of the foregoing.

One or more of systems 100, 200, 400, 500, 700, 900, and 1100 may be combined with other portions of systems 100, 200, 400, 500, 700, 900, and 1100.

Although the present disclosure has been described in detail, it should be understood that various changes, substitutions, and alterations can be made hereto without departing from the spirit and the scope of the disclosure as defined by the appended claims.

What is claimed is:

1. A system for protecting an electronic device against malware, comprising:
one or more system resources of the electronic device;
one or more operating systems of the electronic device;
a first security module configured to execute on the electronic device at a level below all of the operating systems of the electronic device accessing the one or more system resources; and
a second security module configured to enumerate one or more processes running on the electronic device, the one or more processes visible to the operating system;
wherein the first security module is configured to:
trap one or more attempts to access system resources of the electronic device, the one or more attempts made from a less privileged ring of execution than the first security module;
record information identifying one or more processes attempting to access the system resources of the electronic device;
compare the information identifying one or more processes attempting to access the system resources with the enumerated one or more processes visible to the operating system; and
based on the comparison, determine one or more hidden processes, the hidden processes determined by at least identifying processes whose information was recorded by first security module but were not enumerated by the second security module;
wherein:
the trapped attempts include an attempt to access a register configured to translate a virtual memory address into a physical memory address; and
information identifying one or more processes is recorded based upon the attempted access of the register.

2. The system of claim 1, wherein the first security module is further configured to scan a memory of the electronic device to determine one or more memory modifications caused by the one or more hidden processes.

3. The system of claim 2, wherein the first security module is further configured to repair the memory of the electronic device of any memory modifications caused by the hidden processes.

4. The system of claim 1, wherein the attempts to access the system resources comprises an attempt to conduct a process context switch.

5. The system of claim 1, wherein the second security module is configured to execute on the electronic device on the same or a less privileged ring of execution than an operating system of the electronic device.

6. The system of claim 1, wherein the second security module is further caused to:
enumerate one or more user-mode processes running on the electronic device;
compare the information identifying one or more processes attempting to access the system resources with the enumerated one or more user-mode processes running on the electronic device; and
based on the comparison, determine one or more hidden user-mode processes, the user-mode hidden processes identified by the information recorded by the first security module but not enumerated by the second security module.

7. A method for protecting an electronic device against malware, comprising:
enumerating one or more processes running on the electronic device, the one or more processes visible to one or more operating systems of the electronic device;
trapping, at a level below all of the operating systems of the electronic device accessing system resources of the electronic device, such priority defined by a processor of the electronic device, one or more attempts to access system resources of the electronic device, the one or more attempts made from a same or lower priority than an operating systems of the electronic device, such priority defined by the processor;

recording, at a level below all of the operating systems of the electronic device accessing the one or more system resources, information identifying one or more processes attempting to access the system resources of the electronic device;

comparing, at a level below all of the operating systems of the electronic device accessing the one or more system resources, the information identifying one or more processes attempting to access the system resources with the enumerated one or more processes visible to the operating system; and based on the comparison, determining, at a level below all of the operating systems of the electronic device accessing the one or more system resources, one or more hidden processes, the hidden processes identified at least by determining processes identified by the recorded information of attempts to access the system resources of the electronic device by processes, but not enumerated as visible to the operating system;

wherein:
the trapped attempts include an attempt to access a register configured to translate a virtual memory address into a physical memory address; and
information identifying one or more processes is recorded based upon the attempted access of the register.

8. The method of claim 7, further comprising scanning a memory of the electronic device to determine one or more memory modifications caused by the one or more hidden processes.

9. The method of claim 7, further comprising repairing the memory of the electronic device of any memory modifications caused by the hidden processes.

10. The method of claim 7, wherein the attempts to access the method resources comprise an attempt to conduct a process context switch.

11. The method of claim 7, wherein the steps of comparing the information and determining hidden processes are at a higher priority than all of the operating systems of the electronic device accessing the one or more system resources, such priority defined by the processor of the electronic device.

12. The method of claim 7, further comprising:
enumerating one or more user-mode processes running on the electronic device;
comparing the information identifying one or more processes attempting to access the system resources with the enumerated one or more user-mode processes running on the electronic device; and
based on the comparison, determining one or more hidden user-mode processes at least by determining processes identified by the information recorded to identify processes as accessing system resources, but not enumerated as visible to the operating system.

13. An article of manufacture, comprising:
a non-transitory computer readable medium; and
computer-executable instructions carried on the non-transitory computer readable medium, the instructions readable by a processor, the instructions, when read and executed, for causing the processor to:
enumerate one or more processes running on the electronic device, the one or more processes visible to one or more operating systems of the electronic device;
trap, at a level below all of the operating systems of the electronic device accessing one or more system resources of the electronic device, one or more attempts to access the system resources of the electronic device, the one or more attempts made from a same or less privileged ring of execution than all of the operating systems of the electronic device;
record, at a level below all of the operating systems of the electronic device accessing the one or more system resources, information identifying one or more processes attempting to access the system resources of the electronic device;
compare, at a level below all of the operating systems of the electronic device accessing the one or more system resources, the information identifying one or more processes attempting to access the system resources with the enumerated one or more processes visible to the operating system; and
based on the comparison, determine, at a level below all of the operating systems of the electronic device accessing the one or more system resources, one or more hidden processes, the hidden processes identified at least by determining processes identified by the recorded information of attempts to access the system resources of the electronic device by processes, but not enumerated as visible to the operating system;

wherein:
the trapped attempts include an attempt to access a register configured to translate a virtual memory address into a physical memory address; and
information identifying one or more processes is recorded based upon the attempted access of the register.

14. The article of claim 13, wherein the processor is further caused to scan a memory of the electronic device to determine one or more memory modifications caused by the one or more hidden processes.

15. The article of claim 13, wherein the attempts to access the article resources is an attempt to conduct a process context switch.

16. The article of claim 13, wherein the processor is configured to compare the information and determine hidden processes on a more privileged ring of execution than all operating systems of the electronic device accessing the system resources.

17. The article of claim 13, the processor is further caused to:
enumerate one or more user-mode processes running on the electronic device;
compare the information identifying one or more processes attempting to access the system resources with the enumerated one or more user-mode processes running on the electronic device; and
based on the comparison, determine one or more hidden user-mode processes, the user-mode hidden processes identified at least by determining processes identified by the recorded information as accessing system resources, but not enumerated as a user-mode process running on the electronic device.

* * * * *